(12) United States Patent
Massie et al.

(10) Patent No.: US 7,068,992 B1
(45) Date of Patent: Jun. 27, 2006

(54) SYSTEM AND METHOD OF POLLING WIRELESS DEVICES HAVING A SUBSTANTIALLY FIXED AND/OR PREDESIGNATED GEOGRAPHIC LOCATION

(75) Inventors: Rodney E. Massie, Lindenhurst, IL (US); Julian M. Franklin, Lindenhurst, IL (US)

(73) Assignee: Motient Communications Inc., Lincolnshire, IL (US)

( * ) Notice: Subject to any disclaimer, the term of this patent is extended or adjusted under 35 U.S.C. 154(b) by 227 days.

(21) Appl. No.: 10/606,305

(22) Filed: Jun. 26, 2003

Related U.S. Application Data

(63) Continuation-in-part of application No. 09/958,752, filed as application No. PCT/US00/35513 on Dec. 29, 2000, now Pat. No. 6,947,737.

(60) Provisional application No. 60/173,742, filed on Dec. 30, 1999.

(51) Int. Cl.
H04M 11/00 (2006.01)

(52) U.S. Cl. .................. 455/403; 455/426.1; 370/349; 370/449

(58) Field of Classification Search ............. 455/426.1, 455/422, 525, 432, 403, 426.2, 428; 370/346, 370/347, 449, 450
See application file for complete search history.

(56) References Cited

U.S. PATENT DOCUMENTS

| | | | |
|---|---|---|---|
| 4,412,292 A | 10/1983 | Sedam et al. | |
| 4,910,794 A | 3/1990 | Mahany | |
| 4,924,462 A | 5/1990 | Sojka | |
| 4,940,974 A | 7/1990 | Sojka | |
| 5,442,568 A | 8/1995 | Ostendorf et al. | |
| 5,457,680 A | 10/1995 | Kamm et al. | |
| 5,475,597 A | 12/1995 | Buck | |
| 5,559,520 A | 9/1996 | Barzegar et al. | |
| 5,561,446 A | 10/1996 | Montlick | |
| 5,603,081 A | 2/1997 | Raith et al. | |
| 5,608,643 A | 3/1997 | Wichter et al. | |
| 5,651,009 A * | 7/1997 | Perreault et al. ............ | 370/447 |
| 5,703,570 A | 12/1997 | Gorday et al. | |
| 5,719,771 A | 2/1998 | Buck et al. | |
| 5,772,599 A | 6/1998 | Nevo et al. | |
| 5,787,357 A | 7/1998 | Salin | |
| 5,819,172 A | 10/1998 | Campana, Jr. et al. | |
| 5,822,216 A | 10/1998 | Satchell, Jr. et al. | |
| 5,835,720 A | 11/1998 | Nelson et al. | |
| 5,859,838 A | 1/1999 | Soliman | |
| 5,878,036 A | 3/1999 | Spartz et al. | |
| 5,884,202 A | 3/1999 | Arjomand | |
| 5,910,947 A * | 6/1999 | Futamura ..................... | 370/332 |
| 5,940,751 A | 8/1999 | Kaplan et al. | |
| 5,940,771 A * | 8/1999 | Gollnick et al. ............ | 455/517 |

(Continued)

FOREIGN PATENT DOCUMENTS

EP 0 809 383 11/1997

(Continued)

OTHER PUBLICATIONS

ARDIS Company. 1994. *ARDIS Network Connectivity Guide.*

(Continued)

*Primary Examiner*—CongVan Tran
(74) *Attorney, Agent, or Firm*—Irah H. Donner; Wilmer Cutler Pickering Hale and Dorr LLP

(57) ABSTRACT

A system and method of polling wireless devices having a substantially fixed geographic location, and optionally receiving data from one or more of the polled devices, in a manner that efficiently utilizes network resources.

31 Claims, 10 Drawing Sheets

U.S. PATENT DOCUMENTS

| | | | |
|---|---|---|---|
| 5,941,363 | A | 8/1999 | Partyka et al. |
| 5,963,452 | A | 10/1999 | Etoh et al. |
| 5,974,236 | A | 10/1999 | Sherman |
| 5,974,300 | A | 10/1999 | LaPorta et al. |
| 5,978,679 | A | 11/1999 | Agre |
| 6,028,846 | A | 2/2000 | Cain |
| 6,056,194 | A | 5/2000 | Kolls |
| 6,078,891 | A | 6/2000 | Riordan et al. |
| 6,097,947 | A | 8/2000 | Takai |
| 6,097,962 | A | 8/2000 | Corriveau et al. |
| 6,104,712 | A | 8/2000 | Robert et al. |
| 6,116,743 | A | 9/2000 | Hoek |
| 6,128,320 | A | 10/2000 | Watanabe et al. |
| 6,134,671 | A | 10/2000 | Commerford et al. |
| 6,137,791 | A | 10/2000 | Frid et al. |
| 6,138,022 | A | 10/2000 | Strawczynski et al. |
| 6,178,337 | B1 | 1/2001 | Spartz et al. |
| 6,185,619 | B1 | 2/2001 | Joffe et al. |
| 6,266,537 | B1* | 7/2001 | Kashitani et al. ............ 455/522 |
| 6,411,828 | B1* | 6/2002 | Lands et al. .............. 455/569.1 |
| 6,438,215 | B1* | 8/2002 | Skladman et al. ......... 379/67.1 |
| 6,493,545 | B1* | 12/2002 | Sugaya ........................ 455/272 |
| 6,519,464 | B1* | 2/2003 | Santhoff et al. ......... 455/456.5 |
| 6,697,415 | B1* | 2/2004 | Mahany ...................... 375/130 |
| 6,721,305 | B1* | 4/2004 | Chan et al. .................. 370/349 |
| 6,745,011 | B1* | 6/2004 | Hendrickson et al. ... 455/67.11 |
| 2002/0160771 | A1* | 10/2002 | Massie et al. .............. 455/426 |
| 2003/0054818 | A1* | 3/2003 | Bahl et al. .................. 455/432 |

FOREIGN PATENT DOCUMENTS

| | | |
|---|---|---|
| EP | 0 967 775 | 12/1999 |
| WO | WO 97/47144 | 12/1997 |

OTHER PUBLICATIONS

Motorola. 1995. *DataTAC Open Protocol Specifications: Standard Context Routing Release 1.0*. (Doc. No. 68P0425C20-A). Richmond, British Columbia: Motorola, Inc.

Motorola. 1995. *DataTAC Open Protocol Specifications: User's Guide*. (Doc. No. 68P04025C25-A). Richmond, British Columbia: Motorola, Inc.

ARDIS Company. 1997. *ARDIS DataTac 4000: Software Developers Reference Guide*. Revision 2.0.

Motorola. 1997. *DataTac Wireless Data Networks: Applications Development Guide* (Doc. No. 6804111L20-A). Richmond, Virginia: Motorola, Inc.

Apr. 5, 2001. International Search Report from PCT Application No. PCT/US00/35513.

Nov. 8, 2001. Written Opinion from PCT Application No. PCT/US00/35513.

Dec. 1993. "Software Product Description: RoamAbout Transport Version 2.0 for MS-DOS and MS-Windows." *digital*.

Motorola. Sep. 1995. *Wireless Data Communications: The Choices*. Bothell, Washington: Motorola, Inc.

Motorola. Nov. 1995. *DataTAC Open Protocol Specifications: DataTAC Messaging Release 1.0*. (Doc. No. 68P04025C10-A). Richmond, British Columbia: Motorola, Inc.

Stilwell, Markus. Nov. 16, 1995. *What is Data Mining?* www.cs.usask.ca/homepages/grads/mgs310/Cmpt826S3/node5.html.

Motorola. Jan. 1996. *DataTAC Networks: Introduction for Application Developers*. (Doc. No. 6804111L12-O). Bothell, Washington: Motorola, Inc.

Noble, B., G. Nguyen, M. Satyanarayanan and R. Katz. Oct. 1996. "Mobile Networking Tracing." *Internet RFC/STD/FYI/BCP Archives*. Doc. No. RFC2041.

ARDIS Company. Jan. 1997. *ARDIS DataTac 4000: Software Developers Reference Guide*. Revision 2.0.

Moss, Julian. Sep. 1997. "Understanding TCP/IP." *PC Network Advisor*, Issue 87, pp. 3-6.

Motorola. Nov. 1997. *DataTAC Wireless Data Networks: Application Development Guide*. (Doc. No. 6804111L20-A). Bothell, Washington: Motorola IPSG.

Motorola. 1997. "Multiple Agencies Share New System in Peel Region." *Exchange Online*. www.motorola.com/LMPS/RNSG/exchange/spr97/index.html.

Fabris, Peter. May 15, 1998. "Advanced Navigation." *CIO Magazine*.

Kessler, Gary C. Apr. 23, 1999. "An Overview of TCP/IP Protocols and the Internet." Hill Associates, Inc.

Jul. 19, 1999. "American Mobile to Deliver Wireless Telemetry Applications Through Parterships with CA and cStar Technologies; ARDIS Network to be Utilized for Monitoring Remote Devices; Vending Machines, Utility Meters, Traffic Lights and ATMs Targeted." *In The News*. 1999 Press Releases. Motient Corporation. www.motient.com/Content/IntheNews/PressReleases/1999PressReleases/99-20.html.

Greiner, Lynn. Aug. 27, 1999. "Online Management Becomes the Real Thing." *Computer Dealer News*. www.cstartech.com/real_thing1.html.

Nov. 7, 1999. "How ARP Works & Why Duplicate Addresses Shouldn't Be Used." *Microsoft Product Support Services*. wysiwgy://85/http://support.Microsoft.com/support/kb/articles/Q93/5/58.A.

Computer Associates. 1999. "Unicenter TNG: Total Enterprise Management." Islanddia, New York: Computer Associates International Inc.

Salkintzis, Apostolis K. 1999. "A Survey of Mobile Data Networks." *IEEE Communications Surveys*. Third Quarter 1999, vol. 2, No. 3.

1999. "Overview of IPM." Cisco Systems Inc. http://www.cisco.com/univercd/cc/td/doc/p...rtrmgmt/ipmcw2k/ipm20/ipmug20/ipmover.html.

Motorola. Mar. 2000. *DataTAC 5000 System Release 6.1: Application Programmer's Guide* (Doc. No. 68P04053C04 REV1). Richmond, British Columbia: Motorola, Inc.

Fonseca, Brian. Apr. 11, 2000. "Computer Associates touts its Unicenter platform for device management." Infoworld.com. www.infoworld.com/cgi-bin/deletefr...cles/en/xml/00/4/000411encamobile.xn.

Apr. 11, 2000. "Computer Associates and American Mobile Satellite Corp. Extend Wireless Enterprise Applications for eBusiness: Mobile eBusiness Applications Take Off with ARDIS Wireless Data Network Seamlessly Integrated With CA's Unicenter TNG." *Press Room*. wysiwyg://235/http://www.ca.com/press/2000/04/tng_americanmobile.html.

Apr. 11, 2000 "Computer Associates and Motient Extend Wireless Enterprise Applications for eBusiness." *AboutMotient*. www.motient.com/content/aboutmotient/businesspartners/ca.html.

Apr. 11, 2000. "Computer Associates Dispenses New Revenue Opportunities for the Vending Machine Industry With Unicenter TNG Optimal Vending Solution: CA and cStar Partner to Deliver Increased Customer Service Levels and Reduced Operational Costs With Remote eBusiness Management Application." *Press Room*. wysiwg://231/http://www.ca.com/press/2000/04/tng_vending.html.

Casselman, Grace. May 5, 2000. "Net Mania Abounds at CA World." *NetworkWorld*. www.itworldcanada.com/nw/archive/nw10-09/nw_Wtemplate.cfm?filename=n109n2.html.

Menezes, Joaquim. May 26, 2000. "Enterprise Computing." *Computing Canada, The Newspaper for Information Technology Management*, vol. 26, Issue 11. www.cstartech.com/enterprise2.html.

Hyppönen, Mikko. Sep. 2000. "WAP and Viruses—Can your Mobile Phone Get Infected?" *Virus Bulletin Conference*. Virus Bulletin Ltd, The Pentagon, Abingdon, Oxfordshire, England.

Sep. 2000. "Creating Internet Wave III by Connecting Non-IT World to IT World Via any Media [Wireless WAN, LAN, Landline & PLC (power Line Carrier)]." *CStar Technologies Inc.* www.startech.com/newpg.htm.

Sep. 2000. "DirectGate™, Festures & Benefits." http://www.cstartech.com/ben.html.

Sep. 2000. "Enterprise Management Startegy: Managing the Extended Enterprise." *Unicenter TNG*. Computer Associates International, Inc. http://cai.com/products/unicent/whitepap.html.

Sep. 2000. "SNA." *ATM Protocol Directory*. http://www.protocols.com/pbook/sna.html.

Sep. 2000. "System Performance & Hardware Platform." http://www.cstartech.com/hard.html.

Sep. 2000. "Vending." *Rutherford & Associates*. www.ruthsx.com/products/vending.html.

Sep. 2000. "X.25." *ATM Protocol Directory*. http://www.protocols.com/pbook/x25.html.

Pentikousis, Kostas. 2000. "TCP In Wired-Cum-Wireless Environments." *IEEE Communications Surveys*. Fourth Quarter 2000, pp. 2-14.

Sevitt, Carol. 2000. "Solbyung (Stella) Yoon: Living Her Dream." *Rotman Management: The Alumni Magazine of the Rotman School of Management*. www.cstartech.com/rotmanm.html.

Fairhurst, Gorry. Jan. 1, 2001. "Address Resolution Protocol (arp)." www.erg.abdn.ac.uk/users/gorry/course/inet-pages/arp.htm.

Unger, Lorin. Feb. 14, 2001. "Blackberry 957." *Wap.com*. wysiwgy://165/http://www.wap.com/share/osas/cache/artid500407.html.

Gagnon, Louis-Philippe and Nick Ratelle. Feb. 28, 2001. "RIM: Pager gone PDA". Macadamian Technologies Inc. www.macadamian.com/column/rimdevelopment.htm.

Mar. 27, 2001. "Overview: Cisco Wireless Network Management Suite 1.0." http://www.cisco.com/univercd/cc/td/doc/product/rtrmgmt/wireless/nm_suite.html.

May 23, 2001. "ARP." *Enterprise Storage Strategies Conference & EXPO*. internet.com. wysiwyg://69/http://www.pcwebopedia.com/TERM/A/ARP.htm.

Kessler, Gary C. May 29, 2001. "An Overview of TCP/IP Protocols and the Internet."

Oct. 3, 2001. "TCP/IP and IPX routing Tutorial." *Sangoma Technologies*.

Hays, Constance L. Oct. 23, 2001. "For Retailers of Luxury Goods, Business Has Dried Up." CBSMarketWatch.com.

Flack, Marjorie. 2001. "The Story of the PING Program." http://ftp.arl.mil/~mike/ping.html.

Motorola. 2001. "Vanguard Applications Ware Serial Feature Protocols: TPDU Protocol." Mansfield, Massachusetts: Motorola, Inc. pp. 1-101.

2001. "Reearch In Motion: RIM 850 Wireless Handheld." *GoAmerica: Wire Data Solutions*. Wysiwyg://127/http://www.goamerica.net/showcase/rim850/index.htm.

2001. "Technical Information: Routing Requirements on the Motient Network." PARTNERAREA. www.motient.com/content/partnerarea...program/technicalinformation/technical.

2001. "Understanding ARP: A NetworkUptime.com Tutorial." *Network Tutorials*. www.networkuptime.com/tutorials/arp.

Jarosik, Michael. "The Wireless Battleground." *Business uplugged: [part3]*.

McMahan, Michael L., Ali Khatzibadeh and Pradeep Shah. "Wireless Systems and Technology Overview." Dallas, Texas: Texas Instruments.

Stallings, William. "Data and Computer Communications." *Electronic Mail—SMPT and Mime*. MacMillan, 5$^{th}$ edition, pp. 701-724.

"Ping." *Connected: An Internet Encyclopedia*. wysiwyg://75/hppt://www.freesoft.org/CIE/Topics/53.html.

"Unicenter TNG® Optimal Vending Solution." *Real World Management Solutions*.

* cited by examiner

UNSOLICITED POLL RESPONSE

SYSTEM AND METHOD OF POLLING WIRELESS DEVICES HAVING A SUBSTANTIALLY FIXED AND/OR PREDESIGNATED GEOGRAPHIC LOCATION

RELATED APPLICATIONS

This application claims priority to, and is a continuation-in-part of U.S. application Ser. No. 09/958,752, with an International filing date of Dec. 29, 2000, which is a U.S. National Phase Application under 35 U.S.C. 371 and claims priority to International Application No. PCT/US00/35513, also having a filing date of Dec. 29, 2000, which claims priority from U.S. provisional application Ser. No. 60/173, 742 filed on Dec. 30, 1999, the details of the above applications are hereby incorporated by reference.

BACKGROUND OF THE INVENTION

1. Field of the Invention

The present invention relates generally to a system and method of polling wireless devices having a substantially fixed predetermined, current and/or predesignated geographic location in a manner that efficiently utilizes network resources. More particularly, the present invention relates to a system and method of polling wireless devices, and transmitting data from the wireless devices to a computer configured to receive the data from each respective wireless device to, for example, determine status of the wireless devices in the wireless system.

2. Background Description

FIGS. 1–3 show a prior art radio frequency (RF) transmission system 100, as disclosed in U.S. Pat. No. 5,819,172, incorporated herein by reference, for transmitting information from one of a plurality of originating processors A–N to at least one of a plurality of destination processors (A–N) which may be transported during operation. The system 100 includes: at least one gateway switch 150 that stores information received from one of the at least one originating processor prior to transmission of the information to the at least one destination processor; a RF information transmission network 130 for transmitting stored information received from one of the at least one gateway switch 150 by RF transmission to at least one destination processor; and at least one interface switch 162 that connects a gateway switch 150 to the RF transmission network 130 and transmits stored information received from one of the at least one gateway switch 150 to the RF information transmission network 130.

The information is transmitted to a receiving interface switch by the electronic mail system in response to an address of the receiving interface switch which has been added to the information originated by the originating processor by either the originating processor or gateway switch 150. The information is transmitted from the receiving interface switch to the RF information transmission network 130 with an address of the destination processor to receive the information which has been added by either the originating processor, a gateway switch or the receiving interface switch.

More particularly, FIG. 2 illustrates a block diagram of the connection between a plurality of gateway switches with mailboxes 150 in different electronic mail systems to the RF information transmission network 130. Multiple gateway switches with mailboxes 150 from a single electronic mail system 1–N may be connected to each interface switch 162 instead of the connection of a single gateway switch with a mailbox to a single interface switch as illustrated. A plurality of interface switches 162 connect information transmitted from at least one electronic mail system as illustrated in FIG. 1. Optionally, a plurality of electronic mail systems 1–N are connected to a data input port of the RF information transmission system which is preferably hub switch 116. The dotted line communication paths 163 illustrate optional information transmissions in which information from a plurality of different electronic mail systems is concentrated at a single interface switch as illustrated in FIG. 2. The dotted line communication paths 163 illustrate connections to additional gateway switches with mailboxes 150 within electronic mail systems 1–N.

The interface switches 162 function as a security check to determine that information transmissions originating from a gateway switch with mailbox 150 represent transmissions which should be coupled to a hub switch 116 of the RF information transmission network 130. The security check is performed by the interface switch 162 comparing the identification number of the RF receiver 119 which has been added by either an originating processor A–N or a gateway switch with mailboxes 150 with permissible identification numbers or the interface switch performing the addition of the identification number.

The interface switch 162 also removes information added by the electronic mail system 1–N to the information originated by the originating processor A–N from the stored information received from one of the gateway switches 150, and adds information used by the RF information transmission network 130 during transmission of the information originated at the originating processor to a RF receiver 119 in the RF information transmission network 130 which receives the information and transfers it to the destination processor A–N. Additionally, the interface switch 162 encodes data, which is required to format the display of the cathode ray tube (CRT) of the destination processor for the electronic mail system to which the destination processor is connected, in the form of a character or characters which are decoded by either the RF receiver 119 or the destination processor A–N. This information is added in decoded form back to the information which is processed by the destination processor with a format of the electronic mail system to which the destination processor A–N is connected.

The interface switches 162 also function to store information which has been stored by at least one gateway switch 150 that is received from a plurality of originating processors, and assemble the information from a plurality of originating processors into a packet having a predetermined format and transmit the packet to the hub switch 116 within the RF information transmission network 130. The hub switch is the preferable node in the RF information transmission network to which communications from the gateway switches 150 should be transmitted as a consequence of it having jurisdiction over both local access and transport area (LATA) switches 114 and the local switches 112 in the RF information transmission network, which results in lesser network overhead.

The hub switch 116 receives the packet from the receiving interface switch 162 and disassembles the packet into information from the plurality of originating processors. The originating processors are either within a single electronic mail system such as system 100, or from a plurality of electronic mail systems, such as systems 1–N, or from outside of any electronic mail system from at least one additional processor 312 which is connected directly to interface switch 162 to originate information to be transmitted to a destination processor A–N in an electronic mail system as described below. The RF information transmission network 130 transmits the disassembled information from the hub switch 116, including the identification number of the RF receiver 119 transferring information, to the destination processor A–N to a local switch 112 storing the file identified by the identification number and any destination of the RF receiver in the RF information transmission network to which the information and identification number is to be transmitted by the RF information transmission network, and adds any destination of the RF receiver to the information. The RF information transmission network, in response to any added destination, transmits the information and identification number to the destination for RF broadcast to the RF receiver 119 for transfer to the destination processor A–N.

The information is transmitted to a receiving interface switch 162 from one or more gateway switches 150 by one or more electronic mail systems 1–N in response to an address of the receiving interface switch which has been added to the information originated by the originating processor by either the originating processor or gateway switch. The information is transmitted from the receiving interface switch 162 to the RF information transmission network with an address of the destination processor, such as a name of a user of the destination processor A–N, to receive the information which has been added by either the originating processor A–N, a gateway switch 150 or the receiving interface switch 304.

Preferably, the address of the receiving interface switch is a code word, such as "TF-MOBOX", which is recognized throughout the electronic mail system when appended to information as directing the information to be transmitted to the interface switch 162. The address of the destination processor is preferably the identification number of the RF receiver 119 within the RF information transmission network 130. The address of the receiving interface switch may be added to the information originated by the originating processor, by a gateway switch 150 or by the originating processor A–N. The address of the receiving interface switch 162 may be added to the information by matching an identification of the destination processor A–N which may be the name of the individual utilizing the processor or some other information to add an address of an interface switch such as the aforementioned "TF-MOBOX" stored with the matched identification of the destination processor to the information as the address of the receiving interface switch.

Alternatively, the originating processor may be used to add the address of the receiving interface switch 162 by inputting the address of the receiving interface switch (TF-MOBOX) along with an identification of the destination processor A–N (name of recipient using the processor).

The originating processor A–N may also add the address of the receiving interface switch 162 by matching an identification of the destination processor (name of the user of the processor) with a stored identification of a destination processor and adding an address of the interface switch (TF-MOBOX) stored with the matched identification of the destination processor to the information as the address of the receiving interface switch.

The identification number may be added to the information originated by the originating processor or, alternatively, maybe added by the originating processor by matching an identification of the destination processor (the name of the user of the processor) with a stored identification of a destination processor (the authorized user of the destination processor) and adding an identification number stored with the matched identification of the destination processor to the information as the identification number of the RF receiver 119. Alternatively, the aforementioned matching process may be performed by either the gateway switch 150 or the interface switch 162. The additional processors 312 originates information from outside of any electronic mail system.

Processors 312 provide an address of at least one destination processor in an electronic mail system, such as the name of the user, to receive information transmitted by the RF information transmission system 130, or an identification number of the RF receiver 119 receiving information and transferring the information to the destination processor. The interface switch 162 which receives the information from each processor 312 adds information used by the RF information transmission network 130 during transmission of the information to the RF receiver 119 receiving the information in the same manner as described above with respect to the interface switch 162.

Processors 312 are only required to have a telephone modem and support programming to format information for RF transmission to a destination processor A–N within any one of one or more electronic mail systems 1–N. The processors 312 are not required to have the necessary electronic mail system software present in originating processors A–N or interconnections with an electronic mail system. As a result of the connection to the interface switch 162, information originating from the additional processors 312 may be transmitted by RF transmission to a destination processor A–N within any one or a plurality of electronic mail systems with the user of the processor 312, the processor 312 or the interface switch 162 only having to supply an identification number of the receiver 119 to input information into the RF information transmission system 130 for RF transmission to a destination processor.

The difference between originating information by one of the additional processors 312 outside of any electronic mail system and originating information by one of the processors within one of the electronic mail systems is that the direct connection of the additional processor to the interface switch 162 eliminates the requirement for the adding of an address of the interface switch 162 which is required by the electronic mail systems to forward the information to the interface switch where necessary formatting of the information to be compatible with the RF information transmission system is performed. The interface switch 162 packetizes information originating from the additional processors 312 in the same manner as described above with respect to information originating from within an electronic mail system.

Information from within an electronic mail system and originating from additional processors 312 outside of the electronic mail system may be formatted into the same packets which are forwarded to the hub switch 116. Additionally, interface switch 162 may be connected only to the additional processors 312 to provide an interface only for processors outside of any electronic mail system to destination processors A–N within one or more electronic mail systems 1–N. The only information which is necessary to be inputted by the additional processors 312 is the address of the destination processor (user of the processor). The addition of the identification number of the receiver 119 may be added by matching of an identification of the destination processor with stored destination processors within the additional processor 312, or the interface switch 162 with an identification number of the receiver 119 stored with an identification of a destination processor A–N used as an identification of the destination processor upon a match having been made.

U.S. Pat. No. 5,819,172 does not, however, generally relate to, for example, a system and method of polling wireless devices having a geographic location and/or transmitting data from the wireless devices to a computer configured to receive the data from with each respective wireless device. Nor does U.S. Pat. No. 5,819,172 contemplate, for example, maximizing the number of wireless devices which can be polled at a given time, optionally in a manner that substantially optimizes RF capacity.

SUMMARY OF THE INVENTION

It is one optional feature and advantage of the present invention to provide a system and method of polling wireless devices having a geographic location, optionally during nonpeak RF capacity times, in a manner that efficiently utilizes network resources.

It is another optional feature and advantage of the present invention to provide a system and method of automatically polling wireless devices and transmitting select data from the wireless devices to a computer associated with each respective wireless device.

It is yet another optional feature and advantage of the present invention to substantially maximize the number of wireless devices which can be polled at a given time, optionally in a manner that substantially optimizes RF capacity.

It is still another optional feature and advantage of the present invention to keep track of number of outstanding polls in a given geographic area associated with, for example, a base transceiver station of a wireless communication system.

It is an additional optional feature and advantage of the present invention to queue poll responses if, for example, a customer host computer connection is down and/or otherwise unresponsive, and forward queued messages to the customer host when host connectivity is reestablished.

The system and method in accordance with the present invention provides the ability to poll, for example, subscriber units (SUs) having a substantially fixed location, preferably and optionally during nonpeak RF capacity times. As used herein, polling refers to a communication network arrangement whereby a computer, sequentially and relatively quickly, asks one or more remote SUs whether they want to transmit some information. The purpose is to give each remote SU an opportunity to transmit and/or receive information on the network, at a predetermined time and/or during a predetermined time period.

In at least one embodiment, in order to keep from flooding the network with poll requests it is preferred that polling time frames, polling intervals and poll retries be controlled and/or monitored. In at least one embodiment, the system maintains a list of SUs that are to be polled prior to the configured polling start times. The system polls the SUs as soon as the poll start window is reached.

At least one embodiment of the fixed point polling service in accordance with the present invention is logically divided into the following functional areas: 1) poll data download, 2) scheduled poll initiation, 3) poll status inquiry, and 4) unsolicited poll response. The poll download server is responsible for accepting host to system poll request messages from customer hosts, and inserting them into, for example, a poll information database. Once insertion into the poll information database is complete, the system preferably responds to the host with a host to system poll indication message. This message tells the host that the system has stored the message, and will attempt to poll the SU during one or more of the configured poll time frames. If the poll download server is unable to insert the poll request into the poll information database, the poll download server responds to the host with a message indicating why the poll request was denied.

The poll scheduler server preferably tracks poll start and stop times, poll initiation, poll status and poll retries. When it is time for the poll scheduler to search for poll requests, the poll scheduler reads queued or otherwise stored polls from the poll information database. The poll scheduler also tracks the number of poll attempts for each poll request. If a poll request has exhausted the maximum number of poll attempts, the poll scheduler optionally sends a negative acknowledgement (NAK) to the customer's host and mark the poll status as failed. The poll scheduler server can also optionally update the first data repository to indicate that the poll request has been stored in the second data repository. The poll scheduler server can also optionally receive at least one of an acknowledgement (ACK) and a NAK response message from the RF capacity server.

In order to keep from flooding the network with poll requests it is preferred that the poll scheduler server keep control of polling time frames (e.g., poll start and stop times), poll initiation, poll status and poll retries. Therefore, the system maintains a list of customer SUs that are to be polled. The system preferably begins polling the SUs as soon as the poll start window is reached.

The RF capacity server preferably distributes poll requests to the appropriate RF/RNCs and base stations throughout the network. When it is time for the RF capacity server to begin distributing poll requests, in at least one embodiment it will read the data repository of queued polls. If the read completes without error, the RF capacity server will forward the poll request to the appropriate SU manager server, which transmits the poll to a SU. When an ACK or a NAK is received, the RF capacity server will forward the message to the appropriate poll scheduler server and set an internal timer waiting for an unsolicited message from the SU. When an unsolicited message is received for the SU, the poll routing server will send a poll inquiry message to the appropriate RF capacity server. At this point, in at least one embodiment, the RF capacity server checks its internal timer queue and preferably returns an indication to the poll routing server as whether we were expecting a poll status message. If the timer expires, RF capacity server will forward a NAK to the appropriate poll scheduler server.

Therefore, at least one embodiment of the present invention utilizes a wireless communication system for polling wireless devices. The system uses at least one wireless device capable of receiving a poll request that originates from a host computer. Each wireless device communicating with the host computer preferably uses or is assigned to a respective predetermined base transceiver station of the system. Different number of servers may optionally be used in the present invention and/or a single server may optionally be used to perform some or all of the above-described functionality.

A routing switch communicates with the host computer and the base transceiver station, and utilizes a poll download server that communicates with the host computer. The routing switch receives a poll request from the host computer pertaining to which one or more of wireless devices are to be polled. The poll download server preferably communicates with a first data repository for storing the poll request data that preferably includes data pertaining to at least one of an identifier associated with a wireless device, the predetermined base transceiver station associated with the wireless device, and a customer identifier associated with the wireless device. The routing switch also utilizes a poll scheduler server, that accesses the first data repository, preferably on a real time or substantially real time basis, for queuing the poll request data on a second data repository.

In addition, the routing switch uses a radio frequency (RF) capacity server, preferably communicating with at least the poll scheduler server and the second data repository, for maintaining outstanding poll requests. A wireless device management server, preferably communicating with at least the RF capacity server, receives poll requests from the RF capacity server. A radio frequency server, preferably communicating with the wireless device management server, adds radio frequency information to the poll request. The RF capacity server can also delete poll requests from the second data repository. Finally, a protocol server, preferably communicating with at least the radio frequency server, adds a protocol header to the poll compatible with the wireless device to which the poll is transmitted.

The first embodiment optionally utilizes a fixed customer data repository that communicates with the poll download server and the RF capacity server. The fixed customer data repository preferably contains data pertaining to a customer host identifier and the amount of time after a poll acknowledgement is received to consider a message from a wireless device as a poll response. The fixed customer data repository also optionally contains data pertaining to at least one of the minimum amount of time that must expire before a poll can be retried and the number of polling retries allowed per polling day.

In operation, the poll download server preferably reads the first data repository to validate at least one of the wireless devices and the customer. The first data repository preferably includes data pertaining to a host computer identifier, a wireless device identifier, and poll data. The first data repository can also optionally include data pertaining to at least one of poll data transmitted in the poll message, a status of the poll, and a time at which a last poll was issued.

The system also optionally includes a capacity information data repository, communicating with the poll download server and the RF capacity server, that contains data pertaining to the name of the RF capacity server that is controlling the rate at which polls are transmitted to a radio frequency network control processor.

The system can also include a response server that communicates with the radio frequency server and receives from the radio frequency server an indication of whether a wireless device is responding to the poll request. The indication can optionally be stored in the first data repository.

The system can also include a poll routing server that communicates with the RF capacity server and the protocol server and receives messages from the wireless devices in response to a poll request. In at least one embodiment, the RF capacity server receives a poll inquiry message from the poll routing server and transmits a response to the poll routing server indicating whether the message received from a wireless device has an outstanding poll request.

The system can also include a request server that communicates with the radio frequency server and receives data from the wireless device in response to the poll. The request server can also optionally verify that the wireless device can transmit the data to said host computer.

In a second embodiment, a wireless communication system transmits a data message from a wireless device to a wireless communication system subsequent to the system polling the wireless device. In a preferred embodiment, the system includes a wireless device that receives a poll that originates from a host computer. Each wireless device preferably communicates with a host computer using a predetermined base transceiver station of the system.

A routing switch communicates with the host computer and the base transceiver station. The routing switch includes a radio frequency server that communicates with the wireless device, receives a data message from the wireless device, and removes a radio frequency information from the data message. A host router reads a profile of the wireless device that includes an indication of the host computer to which the wireless device transmits the data message. The host router also adds system routing information to the data message. In addition, a poll routing server receives the data message from the host router and determines if an outstanding poll request is associated with the wireless device. A protocol server communicates with at least the poll routing server, and adds a protocol header to the data message compatible with the host computer to which the data message is transmitted.

The system also includes a radio frequency (RF) capacity server that preferably uses a timer to transmit an indication to the poll routing server as to whether a poll request is outstanding. The RF capacity server further maintains outstanding poll requests and timers for the base transceiver stations. Upon receiving a message, the host transmits an acknowledgement to the poll routing server.

The poll scheduler updates a poll information database to indicate that the host has received the message, receives the acknowledgement from the poll routing server, and updates the poll information database to indicate that the host has received the message. In the event that the host does not receive the message, the host preferably transmits a NAK to the poll routing server. Once a poll request has exhausted the maximum number of poll attempts, the poll routing server transmits a message to the host computer indicating that the poll has not been completed.

In a third embodiment, a wireless communication system is provided for transmitting a data message from a wireless device associated with a first routing switch to a host computer associated with a second routing switch. The system includes a wireless device that receives a poll that originates from a host computer. Each wireless device preferably communicates with the host computer using a predetermined base transceiver station of the system.

The system preferably includes a first routing switch that communicates with the wireless device. In particular, in at least one embodiment, the routing switch includes a radio frequency server, communicating with the wireless device, that receives in response to a poll of the wireless device a data message from the wireless device and removes a radio frequency information from the data message.

A request server receives the data message from the radio frequency server and reads a first data repository containing information that associates an identifier of the wireless device with a host computer. The host router reads network configuration information from a second data repository containing system routing information pertaining to a second routing switch. A radio frequency (RF) capacity server maintains one or more records of outstanding poll requests.

A second routing switch communicates with the first routing switch and includes a second host router that receives the message from the first host router. In addition, a poll routing server receives the message from the second host router and receives an indication from the RF capacity server whether an outstanding poll request is associated with the wireless device. A protocol server communicates with at least the poll routing server, and adds a protocol header to the data message compatible with the host computer to which the data message is transmitted.

Upon receiving the message, the host computer transmits an acknowledgement to the protocol server, which then transmits the acknowledgement to the poll routing server. The poll routing server preferably reads information from a first data repository to determine a correct poll scheduler to transmit the acknowledgement, and updates a second data repository to indicate that the host has received the message.

In additional aspects of the present invention, a method for polling a wireless device having a substantially fixed location includes the steps of associating a wireless device with a base transceiver station (BTS). That is, in accordance with preferred embodiments, the wireless device should be relatively "fixed" in that it transmits to and/or is associated with a predetermined BTS.

In addition, a BTS transmits (but does not necessarily originate), optionally at a predetermined time, a poll to the wireless device to determine whether the wireless device has data to transmit. A predetermined period of time, subsequent to the poll, is used to determine whether a response from the wireless device is considered a response to the poll. Finally, a BTS receives an indication from the wireless device whether a data message is to be transmitted. If a response is prior to the expiration of the predetermined time, the response is considered to be responsive to the poll. If a response is subsequent to the expiration of the predetermined time, the response is not considered to be responsive to the poll. If the response is considered responsive to the poll and the device has data to transmit, the device transmits a data message in response to the poll.

Another method of a communication system polling a wireless device in accordance with the present invention includes the step of establishing a substantially fixed location of a wireless device with respect to the communication system. The device is polled to determine if the wireless device has data to transmit, and a determination is made whether a transmission from the wireless device subsequent to the polling step is in response to the poll. The transmission is considered responsive to the poll if the wireless device transmits to the system within a predetermined threshold time subsequent to the poll.

Finally, a system is provided for polling a wireless device having a substantially fixed location. The system includes means for associating a wireless device with a base transceiver station, and means for setting a time at which to poll the wireless device. The system also includes means for setting a time period subsequent to a poll for which a response from the wireless device is considered a response to the poll. Finally the system includes means for receiving an indication from the wireless device whether a data message is to be transmitted.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other systems and methods for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The Detailed Description including the description of a preferred structure and method as embodying features of the invention will be best understood when read in reference to the accompanying figures wherein.

DETAILED DESCRIPTION

Figure 1:
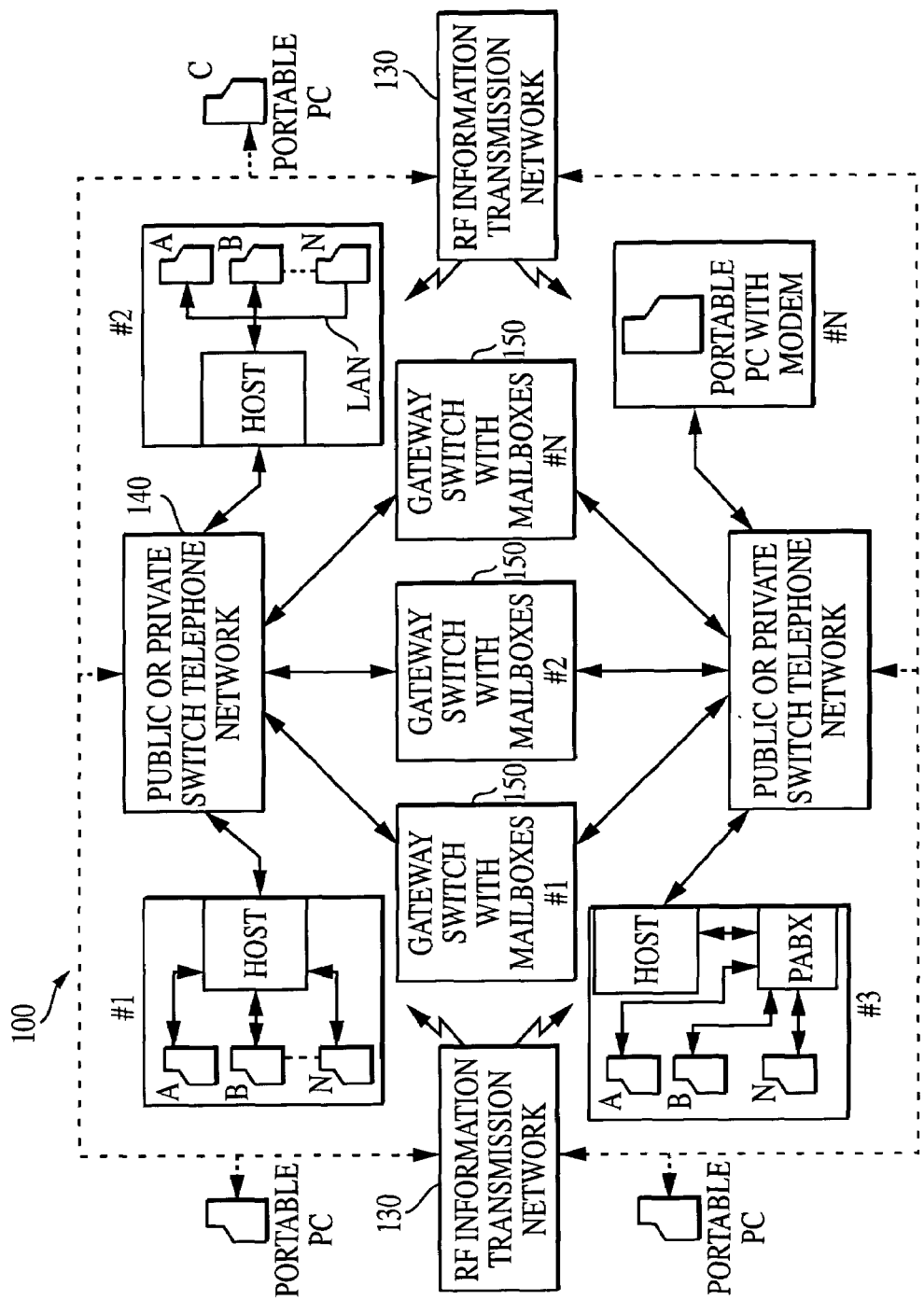
FIG. 1 illustrates a prior art block diagram of a first messaging system.
Figure 2:
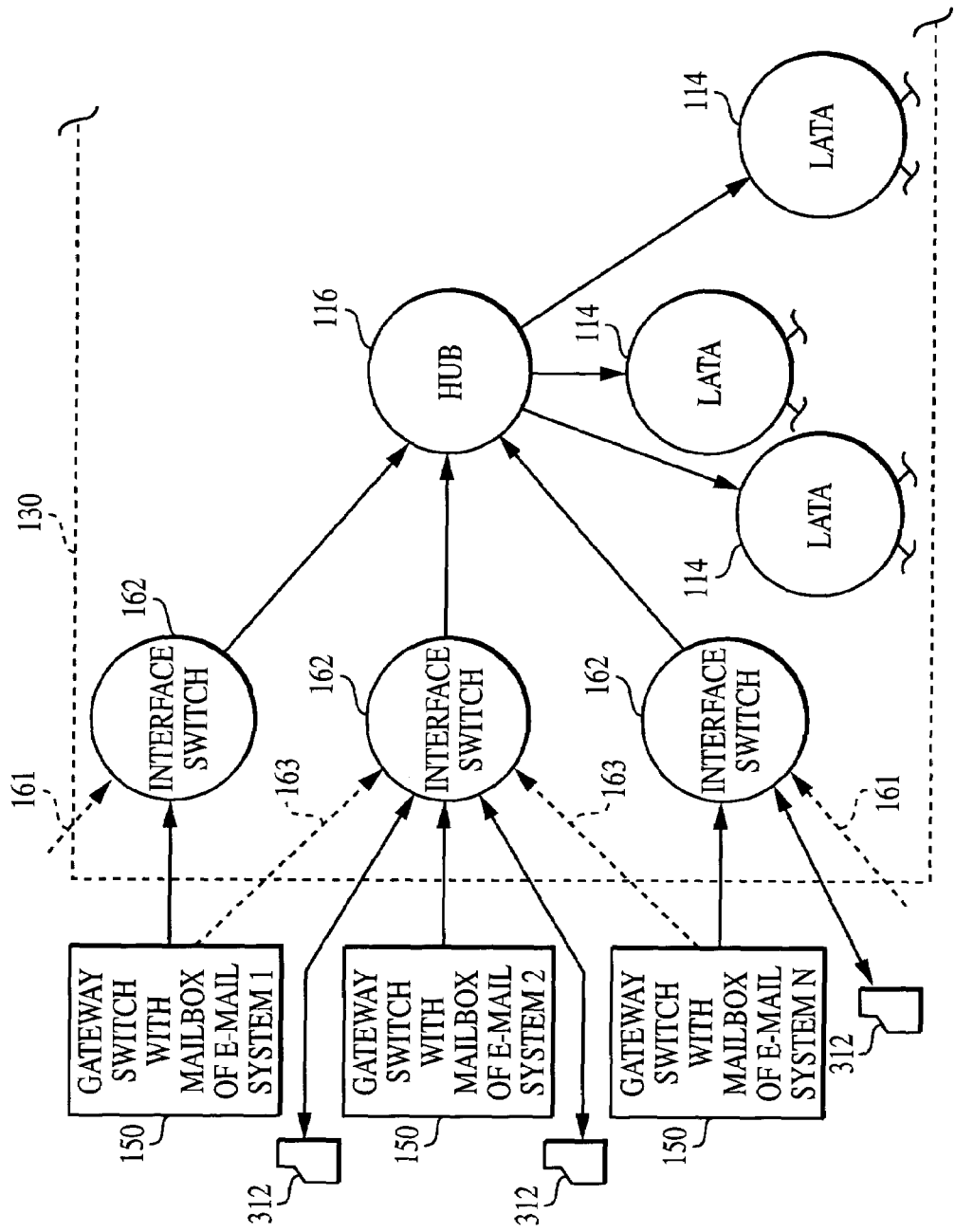
FIG. 2 illustrates a prior art block diagram of the connection of a plurality of electronic mail systems through a plurality of interface switches to an input port of an RF information transmission network.
Figure 3:
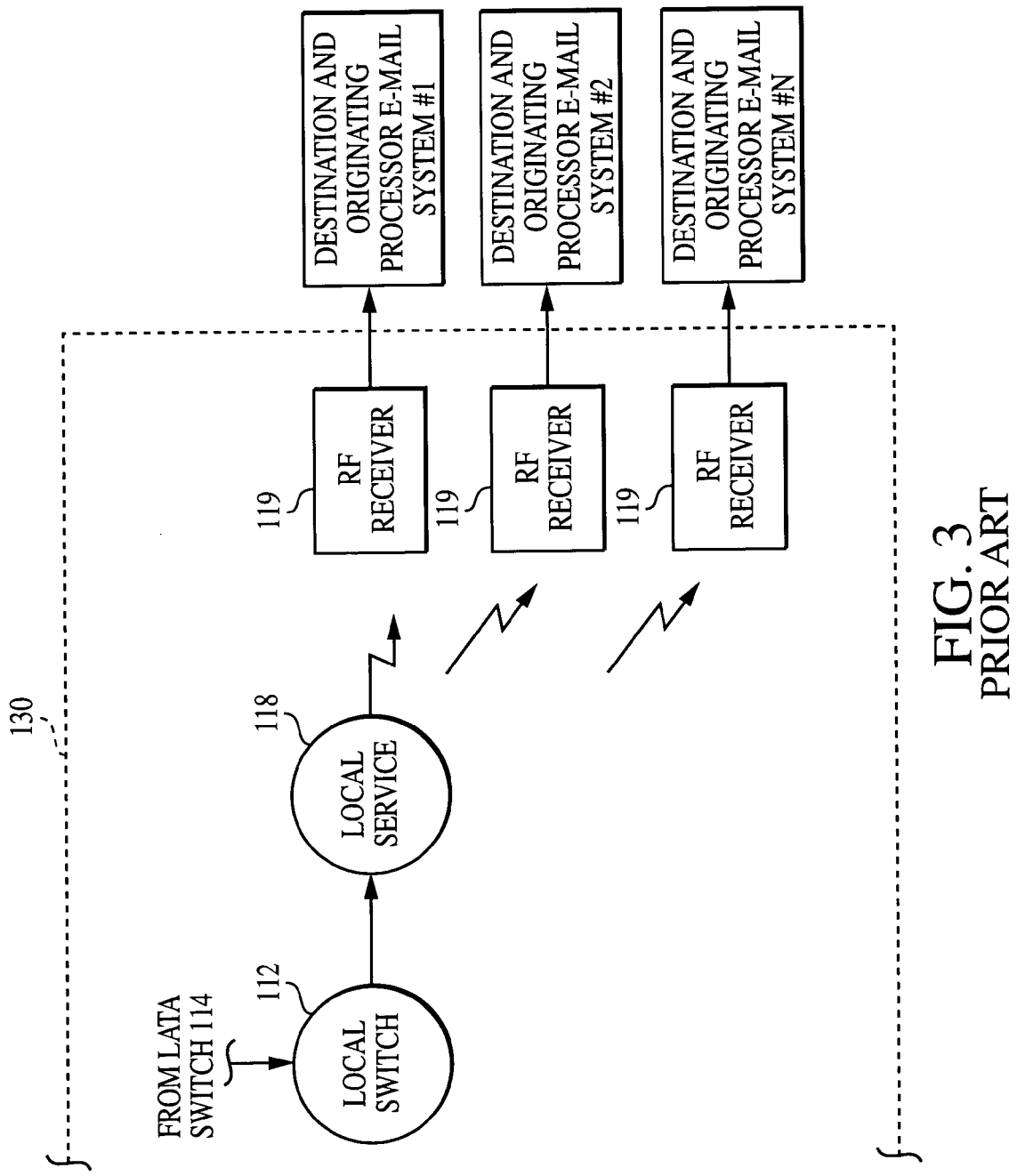
FIG. 3 illustrates a prior art block diagram of the transmission of information originating from a plurality of electronic mail systems to a RF information transmission network to a plurality of destination processors and originating processors within a plurality of electronic mail systems.
Figure 4:
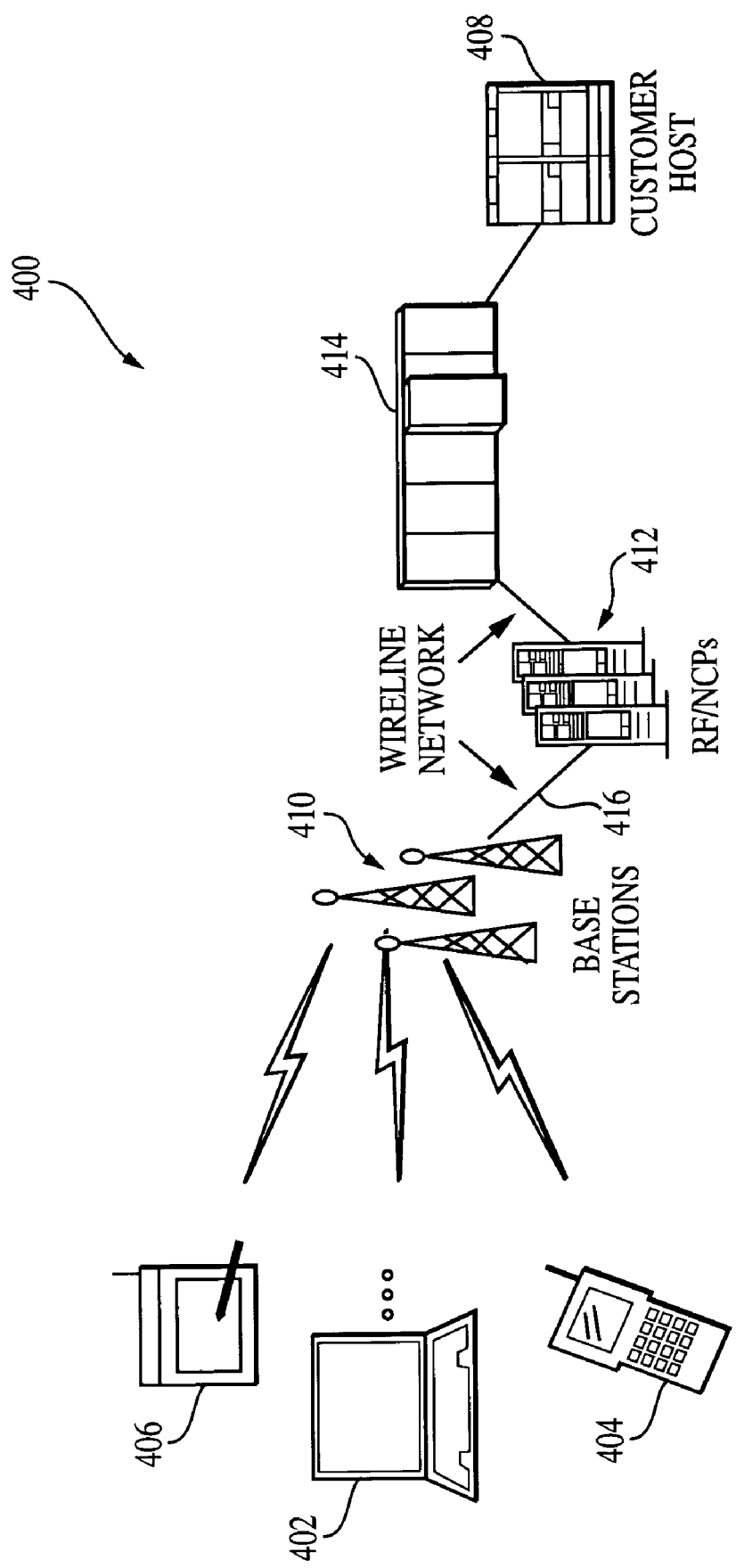
FIG. 4 is a schematically simplified representation of the Motient$^{SM}$ terrestrial communications network.

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

The Motient$^{SM}$ network 400 is a terrestrial wireless two-way data network that is based on Motorola's Radio Data-Link Access Procedure (RD-LAP) technology. RD-LAP is a radio frequency (RF) protocol used for communicating between wireless devices 402, 404, 406 and base stations 410. It was originally developed and jointly owned by Motorola and IBM. In 1995 Motorola acquired 100 percent ownership of what was then called the ARDIS® (Advanced Radio Data Information Services) network. In 1998, ARDIS® was acquired by American Mobile Satellite Corporation (now Motient Corporation, Reston, Va.).

The Motient$^{SM}$ network 400 covers at least ninety percent of the urban business population and more than 500 metropolitan area in the United States, Puerto Rico and the Virgin Islands. Two standard air-interface protocols have been developed for the network 400. The standard Mobile Data Communications-4800 (MDC-4800) protocol provides a 4800 bit/sec service, and the standard RD-LAP protocol provides a 19.2 kbit/sec service.

The network 400 allows SUs such as an intelligent terminal or computing device 402, handheld device 404, and/or other communications device 406 to transmit and/or receive data messages. SUs 402, 404, 406 therefore, typically have a radio frequency (RF) modem for sending and receiving signals. The RF modem utilizes the MDC-4800 and/or RD-LAP protocols to enable SUs to gain access to the Motient$^{SM}$ network 400. In the event a network other than the Motient$^{SM}$ network 400 is utilized, other air-interface communication protocols may be used. For example, if a MOBITEX network is used, the air-interface protocol would utilize Gaussian minimum shift keying (GMSK).

The network 400 has over 2000 base stations (410) that provide service throughout the United States, Puerto Rico, and U.S. Virgin Islands. Each base station 410 covers a radius of approximately 15–20 miles. The base stations 410 are radio frequency towers that transmit or receive radio signals between SUs 402, 404, 406 and the Radio Frequency/Network Control Processors (RF/NCPs) 412. Base stations 410 transmit and receive radio signals, preferably using a narrow band FM transmitter and receiver operating in the 800 MHz frequency band. There are separate frequencies for the transmit path and the receive path; together these two frequencies represent a full duplex channel that normally transmits data at 4800 bps in both directions. Other standard transmission methods may alternatively be used in other standard communication systems.

In operation, for a message "inbound" to the network 400 from a SU 402, 404, 406, the signal is "heard" or received by the base stations 410 and sent over dedicated leased lines 416 to a RF/NCP 412. The network 400 employs an automated roaming capability that allows the free movement of SUs 402, 404, 406 between cities and between multiple channels within a given city. This capability allows the SUs 402, 404, 406 to freely move (roam) across the country and take advantage of all the network services that are available in every locale.

The RF/NCPs 412 are high-speed computers that interconnect multiple base stations 410 with the standard ARDIS® Connect Engine(s) (ACEs) 414. A number of RF/NCPs 412 are located together serving a particular geographical area, each being connected by high speed digital phone service to one of the ACEs 414, which route messages to a destination such as a customer host computer 408 that is directly connected to the network 400 by, for example, a leased telephone line or a value added network.

RF/NCPs 412 manage the RF resources, including the base stations 410 and data sent over the radio channels. Both inbound and outbound channels are managed using different delivery strategies. The RF/NCPs 412 evaluate the strength of the signal received from every wireless device transmission at each base station for each detected inbound data packet. Alternatively, the wireless device or the system may evaluate signal strength and report back to the RF/NCP 412. The RF/NCP 412 then selects the best base station 410 to communicate with that particular wireless device and will send the next outbound message through that base station.

The RF/NCPs 412 also help manage the roaming capability of the network 400. SUs 402, 404, 406 can automatically move (roam) between any of the network 400 frequencies on either of the two protocols (MDC-4800 and RD-LAP 19.2), or between any of the configured network 400 layers that have been configured for in-building or on-street usage. Through periodic transmission of "channel market messages," each SU 402, 404, 406 is provided with the most efficient service available in that area. Each RF/NCP 412 also passes information, via a high speed digital line, relating to source, destination and length of each message to an ARDIS connect Engine (ACE) 414 that enables the network 400 to do network analysis of traffic density at each base station 410.

ACE 414, in turn, passes information back to a RF/NCP 412 concerning whether the SU 402, 404, 406 is properly registered to the network 400 and, if so, what level of service is provided to the respective subscriber 402, 404, 406. The ACEs 414 are general purpose computers that act as the heart of the network 400. The ACEs 414 route messages to the proper destination, store subscriber registration information including entitlement, and perform accounting and billing functions. The ACEs 414 also serve as a point of connectivity to, for example, host 408, perform protocol conversion, and perform network 400 troubleshooting and test functions. A plurality of ACEs 414 are interconnected through dedicated lines, with alternate paths available from each switch as a contingency measure against line interruptions. The linking between host 408 and an ACE 414 is generally accomplished using Transmission Control Protocol/Internet Protocol (TCP/IP), Systems Network Architecture (SNA), or X.25 dedicated circuits.

The wireline network 416 provides communication between the customer host computer 408, the ACEs 414, the RF/NCPs 412, and the base stations 410. The wireline network 416 is equipped with communications equipment that relays customer messages. This equipment includes intelligent multiplexers, leased telephone circuits, high-speed modems or digital service units, and modems for both RF/NCP 412 and host 408 connectivity. Accordingly, the various functionality performed by ACE 414 and the other one or more RF/NCPs 412, and base stations 410 may optionally be distributed in various parts/manners to those network components in accordance with alternative embodiments of the invention.

Inside every cell, the SUs 402, 404, 406 access the network 400 using, for example, a random access method called data sense multiple access (DSMA). Before every transmission, a SU 402, 404, 406 listens to a base station 410 to determine if the base station is busy. The SUs are allowed to transmit only when a base station 410 is not busy and/or have capacity to provide service.

Figure 5:
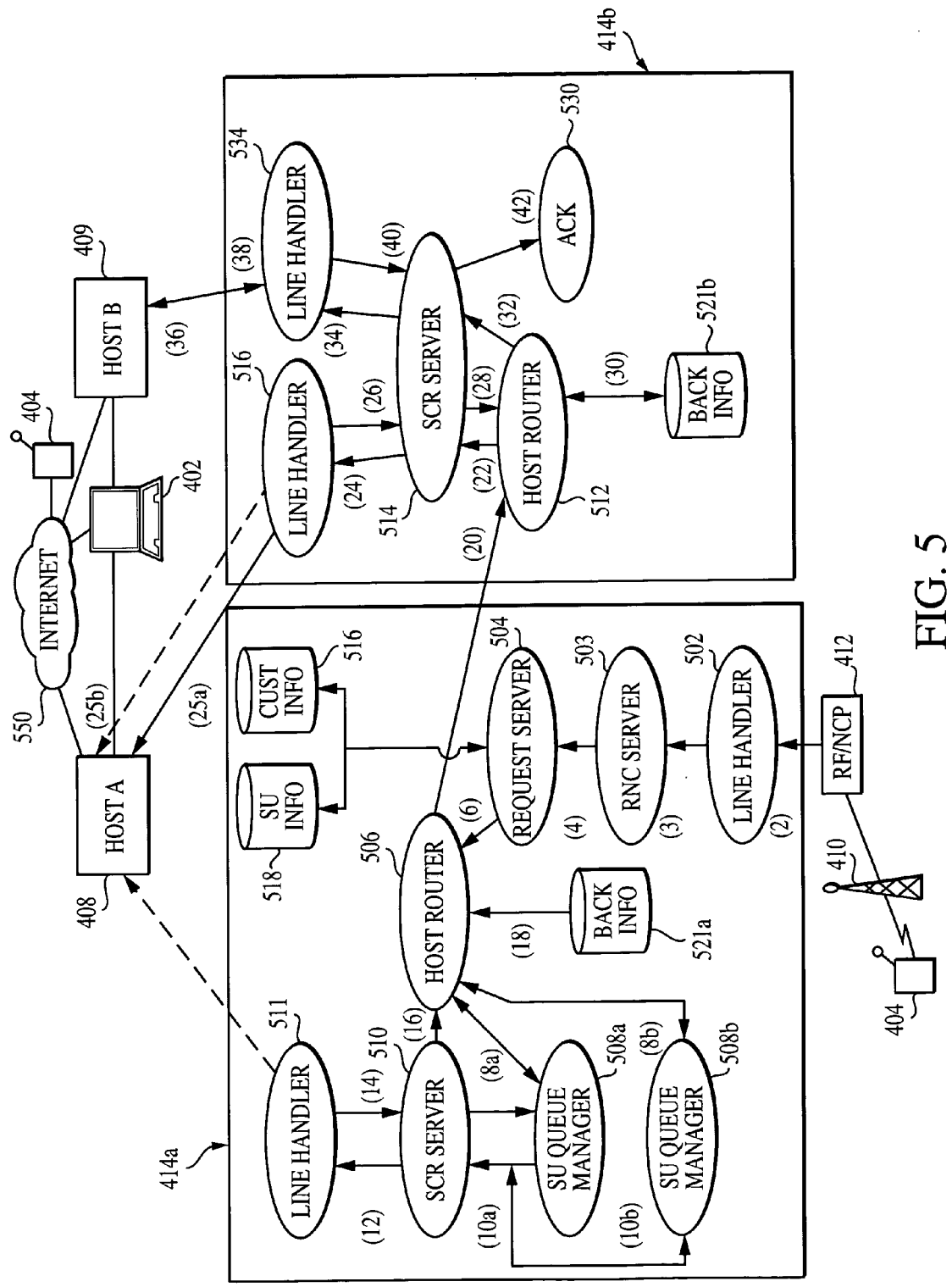
FIG. 5 is an exemplary diagram of a host routing configuration, which also illustrates a method of host routing.

FIG. 5 is an exemplary diagram of a host routing configuration, which also illustrates a method of host routing. Although only two hosts 408, 409 and two nodes 414a, 414b are shown in FIG. 5, any number of host connections may be configured as hot backups. In this embodiment, the customer host primary connection (e.g., host 408) is optionally configured as one-to-many physical connections under one logical grouping. Further, a negative acknowledgement (NAK) message (e.g., a "host down message") can optionally be transmitted to ACE 414a, ACE 414b and/or the originating SU 404 when all primary and hot backup connections are down or otherwise unresponsive and/or unavailable.

More specifically, a SU 404 via, for example, BTS 410 and RF/NCP 412, transmits (2) data (e.g., a message) to ACE 414a. In operation, it is preferred that a message is sent from a SU 404 and (normally) received by host computer 408 via any of the network 400 supported line protocols (e.g., X.25).

The message, via line handler 502, is routed (3) to RNC server 503, which removes any RF transmission headers from the transmitted message. When transmitting a message to a SU 404, the RNC server 503 also adds an appropriate radio frequency (RF) header for RF transmission. The RNC server 503 then transmits (4) the message to request server 504. Request server 504 reads (5) the SU 404 profile, and adds the primary network 400 information to the internal ACE 414a header. In one embodiment, such information can be stored, for example, in one or more databases. For example, the customer information database 516 can store information with regard to whether a customer is in good standing (e.g., bills have been paid on time). The subscriber unit (SU) information database 518 can store the type and level of service provided to each customer and/or SU, and/or data pertaining to usage fees and/or billing.

The request server 504 transmits (6) the data to the host router 506. Host routers 506, 512, can store and/or access information pertaining to each SU 404 and, for example, their associated primary host (e.g., host 408) and/or secondary host (e.g., customer host 409). Host router 506 preferably transmits (8a, 8b) the message to SU queue managers 508a, 508b, respectively, which queues the message. When transmitting to host computers 408, 409, other embodiments of the invention can eliminate use of queue managers 508a, 508b, in which case the message could be transmitted directly to SCR server 510. When it is time to transmit the message, one of the SU queue managers (e.g., a primary queue manager 508a) transmits (10a) the message to the binary SCR server 510, which verifies routing headers before attempting to transmit (12) the message to customer host 408 via line handler 511. In the event that SU queue manager 508a is down or otherwise unresponsive, SU queue manager 508b can transmit (10b) the message to SCR server 510.

Binary SCR is a standard protocol that can be used in host based routing when a SU 404 sends messages to and/or receives messages from a host computer 408, 409 connected to the network 400. Host based routing is generally used for applications which require a central repository of information or on-line service. This type of routing assumes that the host computer 408, 409 is in a fixed location and that the host computer 408, 409 application(s) complements the client application, usually by providing more complex processing. It is preferred that the host computer 408, 409 is connected to the respective ACE 414a, 414b through one of a variety of supported protocols (e.g., SNA LU6.2 or X.25). The physical connection to ACE 414a, 414b can be, for example, a leased line. Alternative standard protocols and/or routing algorithms may optionally be used.

SCR can be used for routing the message from the ACE 414a to host 408 (and 409). SCR is an application header which flows between the network 400 and the customer host 408 (and vice versa). This header is preferably placed at the beginning of the user data. SCR provides for message control and delivery acknowledgment, and can be used with, for example, the SNA LU 6.2, X.25 protocols and TCP/IP protocols. Other standard application headers may alternatively be used that performs or provides the functionality and/or data described herein.

It is preferred that there are at least three types of SCR message headers: Basic Inbound (IB), Basic Acknowledgement (AB), and Basic Outbound (BO). For messages originating at SU 404 via ACE 414a, the IB header is preferably created in SCR server 510. For messages originating at a customer host (e.g., customer host 408), the IB header is preferably created in the customer host 408 application software or communications software and flows from the customer host 408 to the network 400. The network 400 can then direct the message to the appropriate SU 402, 404, 406 via, for example, ACE 414a and/or ACE 414b.

The AB header is created by network 400 (e.g., ACE 414a) and is sent to host 408 (or host 409). An AB header notifies the host 408 that the message sent to a SU 404 was successfully delivered.

An OB header is created by the network 400 (e.g., ACE 414a) for messages sent to the host 408 (and host 409 if operable) from a SU 404. Further information pertaining to the SCR protocol and the Motient$^{SM}$ network can be found in the following documents: ARDIS Network Connectivity Guide, June 1994; *DataTAC Wireless Data Networks: Application Development Guide*, First Edition, November 1997; *DataTAC Open Protocol Specifications Standard Context Routing Release* 1.0, November 1995); *ARDIS DataTAC 4000 Software Developers Reference Guide*, Revision 2.0, January 1997. Each of the aforementioned documents are incorporated herein by reference in their entirety. Copies of these documents are submitted herewith and/or included in the priority applications incorporated by reference in the related applications section of this application. Other standard message headers and/or communication networks may alternatively be used providing the functionality and/or data described herein.

When the message cannot be delivered to the host 408, line handler 511 transmits (14) the message to the SCR server 510 which, in turn, transmits (16) the message to the host router 506. Host router 506 reads (18) backup routing information from database 521a, and transmits (20) the message to host router 512 associated with ACE 414*b*. Host router 512 transmits (22) the message to SCR server 514, which adds a header to facilitate transmission of the message to host 408 via line handler 516. In a first embodiment shown in FIG. 5, the message is successfully transmitted (25*a*) to the host 408 by line handler 516. The message can optionally be subsequently transmitted to, for example, a computing device 402 directly from the host 408 or via the Internet 550, and/or to a SU 404 via the Internet 550.

In a second embodimen, the line handler 516 cannot deliver (25*b*) the message to host 408. Upon determining that the message cannot be delivered to host 408, the line handler 516 transmits (26) the message to SCR server 514 which, in turn, transmits (28) the message to the host router 512. The host router 512 reads (30) alternate routing information from database 521*b*, and transmits (32) the message to SCR server 514, which adds headers to the message. SCR server 514 transmits (34) the message to line handler 534 which, in turn, transmits (36) the message to a backup host (e.g., host 409) as determined by information stored in database 521. The message can optionally be subsequently transmitted to, for example, a computing device 402 directly from the host 408 or via the Internet 550, and/or to a SU 404 via the Internet 550.

When the message has been successfully transmitted, host 409 transmits (38) an acknowledgement to line handler 534 which, in turn, transmits (40) an acknowledgement to SCR server 514. SCR server 514 then transmits (42) the acknowledgement to server 530. As indicated above, other communication networks may optionally be used.

Figure 6:
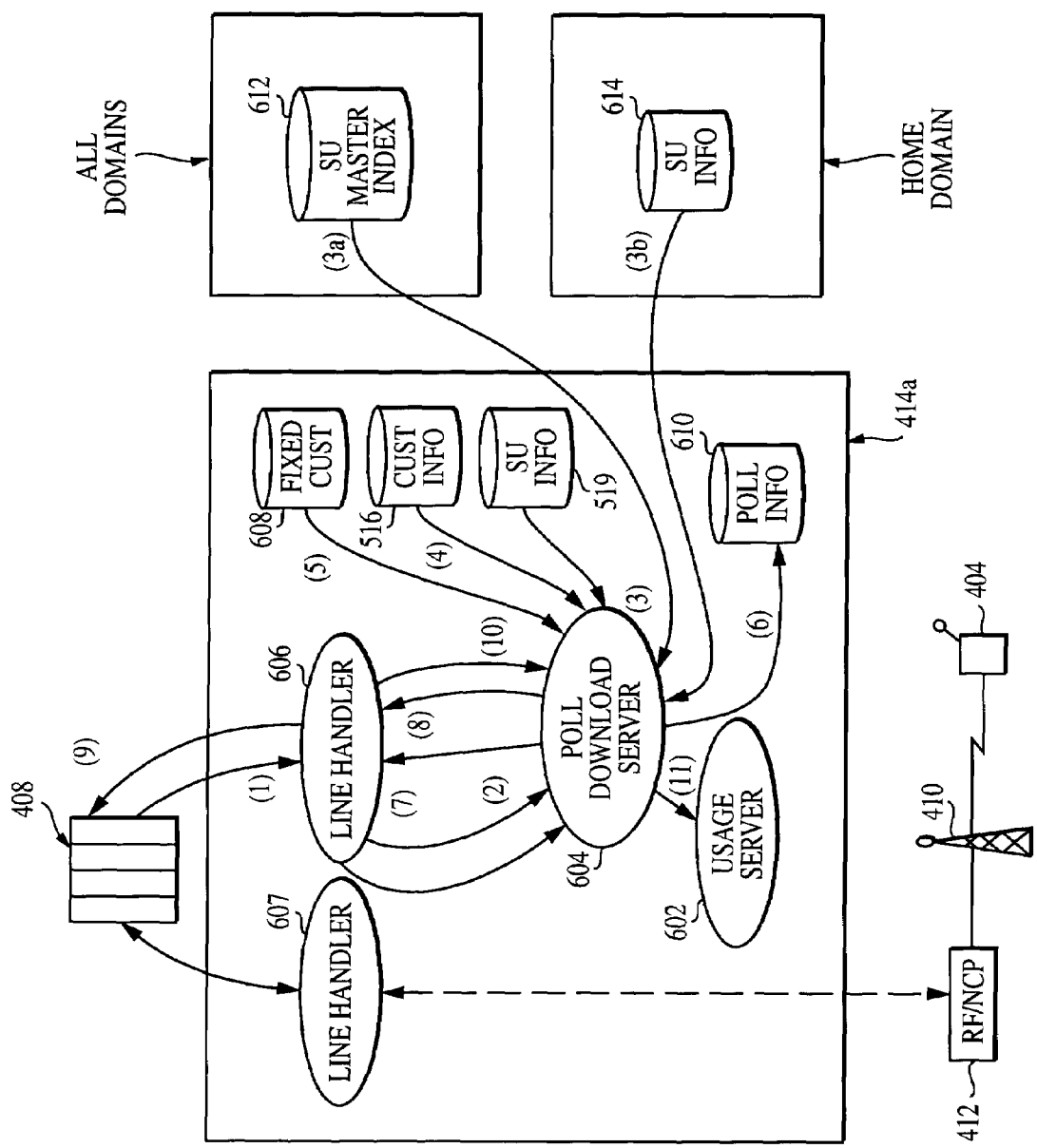
FIG. 6 is an exemplary diagram of a poll download message flow, which also illustrates a method in accordance with the present invention.

The system and method in accordance with FIG. 6 shows an exemplary diagram of a poll download message flow, which also illustrates a method in accordance with the present invention.

Poll download data is delivered (1) from the host 408 to line handler 606, preferably over, for example, a virtual circuit separate from normal production data via line handler 607. This virtual configuration advantageously keeps the poll data from affecting the throughput of the "normal" system 400 traffic. Also, by using this configuration, the system 400 can throttle/control the rate at which a host 408 may download data to ACE 414*a*. In at least one embodiment, a reply to the line handler path send request is not sent until the poll request has been inserted/updated in the poll information database 610, and a poll indication message has been sent to the host line handler 606. This functionality advantageously allows use of an algorithm in the line handler that limits the number of concurrent poll download requests from the customer's host 408. At least one embodiment of the poll information database 610 can utilize one or more of the following fields: CUSTOMER, which serves as a customer identification; DEVICE ID, which is a SU 404 identifier; POLL DATA, which is the poll data passed in the message; POLL STATUS, which is a status of the poll (e.g., pending, executing, successful, retrying, failed); POLL REASON CODE, which indicates the reason for retrying a poll or having a failed poll; and LAST TIME POLL, which is the last time a poll was issued.

The poll download server 604 validates and accepts (2) poll request messages from customer host(s) 408 and inserts (6) them into, for example, the poll information database 610. Prior to insertion, the poll download server 604 verifies (3) from, for example, the SU information database 519 that the SU 404 that is to be polled is valid and registered to the requesting customer. The poll download server 604 also verifies (4) from for example, the customer information database 516 that the customer is in good standing, and further verifies (5) from fixed customer database 608 that the customer utilizes the fixed point polling service. The fixed customer database 608 can also store information pertaining to the correct poll scheduler 714 to route messages. In the event that the SU 404 is not located in the SU information database 519, the poll download server can optionally query (3*a*) the SU master index database 612 and/or query (3*b*) the SU home domain database 614 to validate the SU 404.

Once the poll download server 604 has inserted (6) the poll request into the poll information database 610, the poll download server 604 responds by transmitting (7) a poll indication message and pathsend reply message (8) to line handler 606, which subsequently transmits (9) the poll indication message to host 408. The poll indication message indicates to the host 408 that the system 400 has stored the poll request message and will attempt to poll (one or more of) the designated SU(s) 404 during the configured poll time frame(s). If the poll download server 604 is not able to insert the poll request into the poll information 610 database, the poll download server 610 preferably responds to the host 408 with a message that indicates why the poll request was denied. Finally, the poll download server 604 transmits (11) a usage record to usage server 602, indicating that a fixed point polling request has been scheduled.

In at least one embodiment, the poll download server 604 can utilize parameters such as: 1) STARTPOLLTIME, which can indicate the hour and minute that at which the poll window begins. Valid parameters can be, for example, 00:00–23:59; 2) STOPPOLLTIME, which can indicate the hour and minute that the poll window ends; and 3) SUINFOMIREADTO, which indicates the amount of time that the SUMASTERINDEX database 612 will be read prior to switching back to either of the SU information databases 519, 614.

Figure 7:
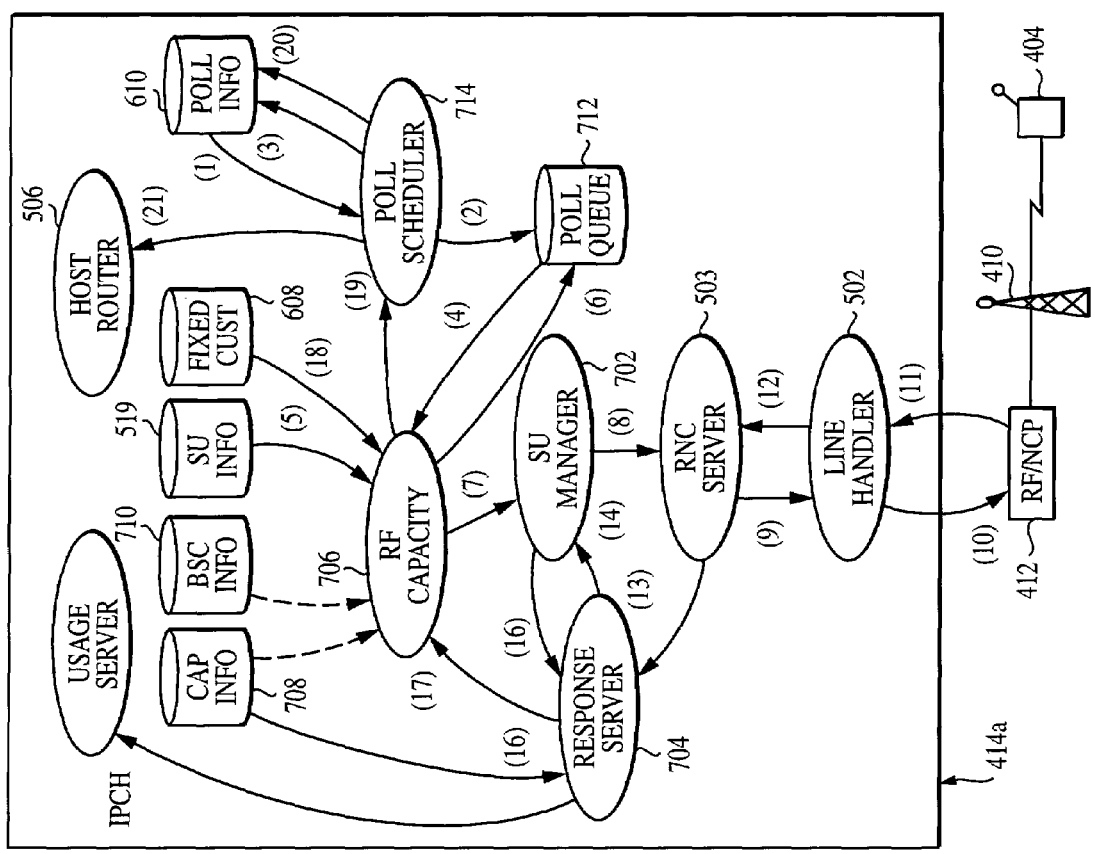
FIG. 7 is an exemplary diagram of a scheduled poll initiation, which also illustrates a method in accordance with the present invention.

FIG. 7 is an exemplary diagram of a scheduled poll initiation, which also illustrates a method in accordance with the present invention. In general, the poll scheduler server 714 is responsible for tracking poll start and stop times, poll initiation, poll status and poll retries. The poll scheduler server also ensures that poll requests do not get queued before the scheduled time, and can optionally notify the host 408 if all retries have been exhausted. At startup, the poll scheduler 714 reads information from the fixed customer database 608 such as a host 408 identifier, a poll response window indicating the amount of time after a poll request ACK to consider unsolicited messages from the device as a poll response (in seconds), and a host failure notification flag indicating if the host 408 expects a notification after all attempts to poll a SU 404 have failed. The fixed customer database 608 can also store data pertaining to maximum poll responses which, if set to a value of, for example, two or more indicates that the poll scheduler will wait for the maximum number poll responses to be received, or for the poll response window to expire before considering the RF/NCP 412 available. The fixed customer database 608 can also utilize other fields.

At startup, the RF capacity server 706 reads data from the Base Station Controller (BSC) information database 710 and from the capacity information database 708. The RF capacity server 706 also generates poll requests on behalf of a host computer 408, and ensures that the network 400 does not get overloaded by such messages. The BSC information database 710 is utilized by, for example, the RF capacity server 706 to obtain the maximum number of concurrent polls allowed and valid polling windows (e.g., poll start and stop times) for each RF/NCP 412. The capacity information database 708 preferably contain data pertaining to the ACE (e.g., 414a, 414b) and process name of the RF capacity server 706 which is throttling the specified RF/NCP 412. The BSC information database 710 also preferably contains data pertaining to the maximum number of concurrent polls allowed and poll start and stop timed for each RF/NCP 412.

The poll scheduler 714 also reads, preferably continuously, poll requests in the poll information database 610 using, for example, the index of System/NetID/Poll Status/Poll Start Time/Next Poll Time. The poll scheduler 714 also preferably maintains statistics pertaining to the number of new poll requests attempted, the number of poll requests completed, the number of poll requests retried, and the number of poll requests failed.

For the initial pass through the poll information database 610, the poll scheduler 714 preferably reads rows that have a poll status equal to zero, indicating that the poll has not yet been attempted. Once all of these records are read, polled and the corresponding unsolicited status message is received, the poll scheduler 714 will read rows that have a poll status of three (last attempt failed—needs to be retried). The poll scheduler 714 also preferably tracks the number of poll attempts for each poll request.

The poll scheduler 714 preferably updates (3) the poll information database 610 to indicate that the poll request has been queued (2) to the poll queue database 712 which, in at least one embodiment, contains poll request data pertaining to at least the destination RF/NCP 412 for the poll, the time that the record was queued, the host 408 that queued this record, and a destination SU 404 identifier.

The RF capacity server 706 reads the poll queue database 712 for poll requests, and distributes poll requests to the appropriate RF/NCP(s) 412 and base stations 410 throughout the network 400. When it is time for the RF capacity server 706 to begin distributing poll requests, it reads (4) the poll queue database 712, preferably continually, using, for example, a field pertaining to the RF/NCP 412 and/or BTS 410. If the read completes without error, the RF capacity server 706 transmits (7) the poll request to the appropriate SU manager. The RF capacity server 706 also reads (5) data from the SU information database 519, and deletes (6) poll requests from the poll queue database 712 once they have been forwarded (7) to the SU manager 702. The poll message is subsequently transmitted (8) to the RNC server 503, a line handler 502 designated by the RNC Server 503 (9), to a RF/NCP 412 (10), and then to the designated SU 404.

When polled, the designated SU 404 transmits either an ACK or NAK message (11), indicating that the SU 404 has information to transmit, or does not have information to transmit, respectively. The ACK/NAK message is transmitted (12) to the RNC Server 503, to the response Server 704 (13), and to the SU Manager 702 (14). The response server 704 processes the ACK and NAK messages, and receives (15) from the SU manager 702 an indication that the message poll message has been dequeued. The Response server 704 preferably reads (16) from the capacity information database 708 prior to transmitting (17) preferably the ACK/NAK to the RF capacity server 706. The RF capacity server 706 also reads (18) from the fixed customer database 608 to verify that the designated SU 402 is registered for the fixed point polling service prior to transmitting (19) the ACK/NAK to the Poll Scheduler 714. The RF capacity server 706 then sets an internal timer waiting for an unsolicited message from the SU 404.

The poll scheduler 714 subsequently updates (20) the poll information database 610 with regard to ACK/NAK status. If the poll can not be transmitted to the designated SU 404, a NAK is transmitted (21) to the host router server 506.

Figure 8:
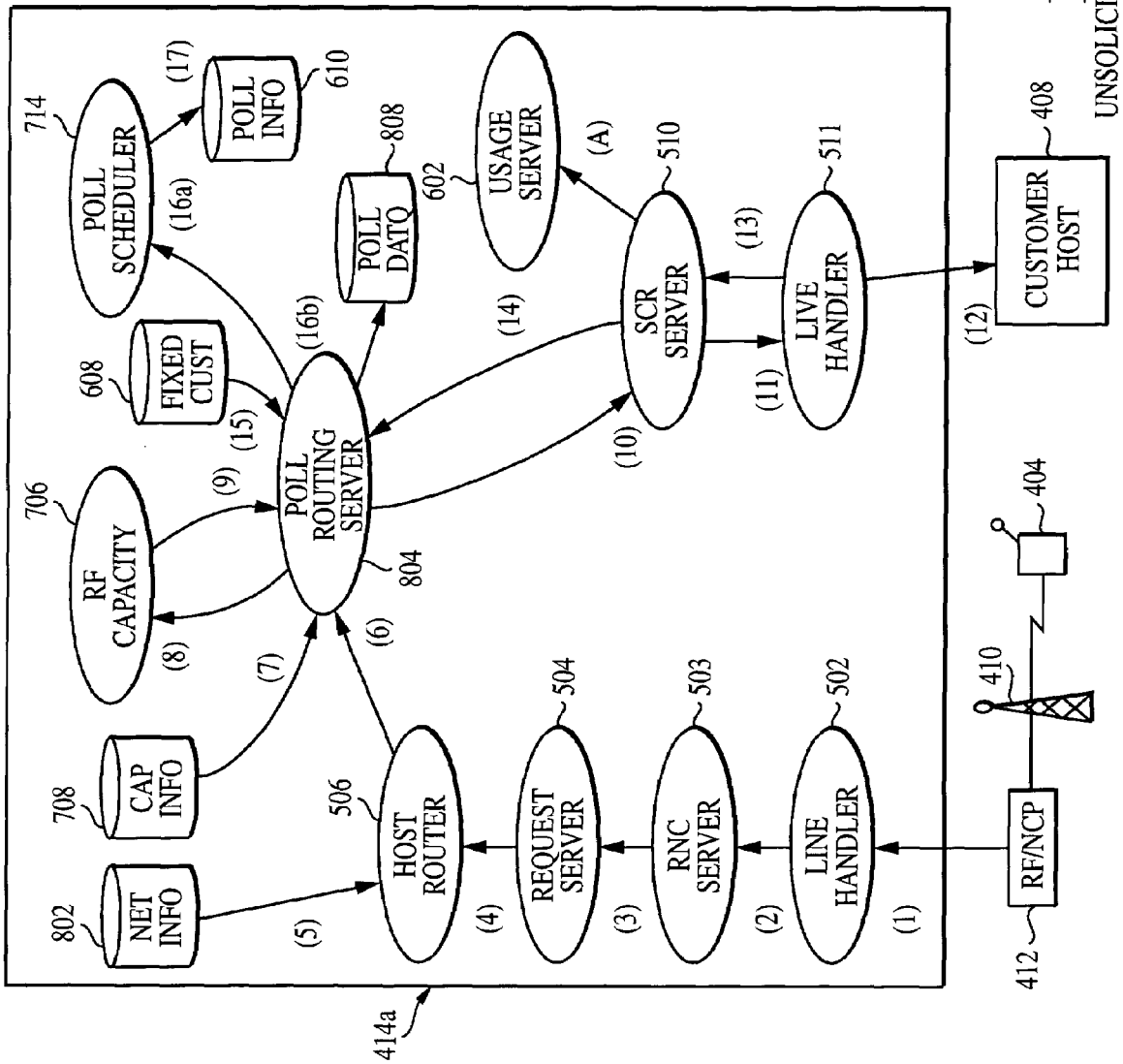
FIG. 8 is an exemplary diagram of a subscriber unit to host poll response when the subscriber unit and host share a common routing switch, which also illustrates a method in accordance with the present invention.

FIG. 8 is an exemplary diagram of a SU 404 to host 408 poll response in which the SU 404 and host 408 are associated with ACEs 414a. FIG. 8 also illustrates a method in accordance with the present invention. FIG. 8 is applicable when, for example, the SU 404 shown in FIG. 7 transmits (11) an ACK, indicating in response to the poll that the SU 404 has data to transmit.

As shown, a SU 404 via, for example, BTS 410 and RF/NCP 412, transmits (1) a message to line handler 502. The message, via line handler 502, is transmitted (2) to RNC server 503, which removes the appropriate radio frequency (RF) message header, adds appropriate ACE 414a routing headers, and transmits (3) the message to request server 504. Request server 504, in turn, then transmits (4) the message to host router 506, which reads (5) network configuration information and/or SU 404 information from network information database 802. The network information database 802 contains network 400 routing information pertaining to the ACE 414a, 414b to which the customer host 408 is connected. Host router 506 then transmits (6) the message to poll routing server 804 which reads (7), as needed, from capacity information database 708 the BTS(s) 410 associated with an RF/NCP 412, and the capacity (e.g., bandwidth) of each BTS 410. The poll routing server 804 also reads the capacity information database 708 to determine the correct RF capacity server 706 to transmit to.

RF capacity server 706 then receives (8) from the poll routing server 804 a poll inquiry message. The RF capacity server 706 checks its internal timer queue and transmits (9) an indication to the poll routing server as to whether a poll request is outstanding. The RF capacity server 706 also maintains lists of outstanding poll requests and timers for RF/NCP 412 and BTSs 410 associated with those lists, and transmits (9) a reply as to whether the message received at host router 506 has a corresponding poll request outstanding. Reply (9) can also be a NAK in the event of, for example, a timeout.

Poll routing server 804 then transmits (10) the data sent in response to the poll to SCR server 510 which, in turn, transmits (11) the message to line handler 511. Line handler 511 then transmits (12) the message to the host 408. Upon receiving the message, the host 408 transmits (13) an ACK via the line handler 511 to the SCR server 510 which, in turn, transmits (14) the ACK to poll routing server 804. The poll routing server 804 then reads (15) the fixed customer database 608 to determine the correct poll scheduler 714 to transmit (16a) the ACK message to. In this case, the poll scheduler 714 is associated with ACE 414a. The poll scheduler 714 then updates (17) the poll information database 610 to indicate that the host 408 has received the message and that the poll process is complete.

In the event that the host 408 does not receive the message, NAKs can be sent to the SCR server 510 and poll routing server 804. The poll routing server 804 then updates (16b) the polldatq database 808 to indicate that the message should be retransmitted at a subsequent time. The polldatq database 808 queues poll status messages to the poll routing server 804. The poll routing server 804 also reads from the polldatq database 808 when it determines that the host 408 is available and ready to receive messages. Once a poll request has exhausted the maximum number of poll attempts, the poll scheduler 714 can optionally transmit a NAK to the host 408 and mark the poll status as failed.

Figure 9:
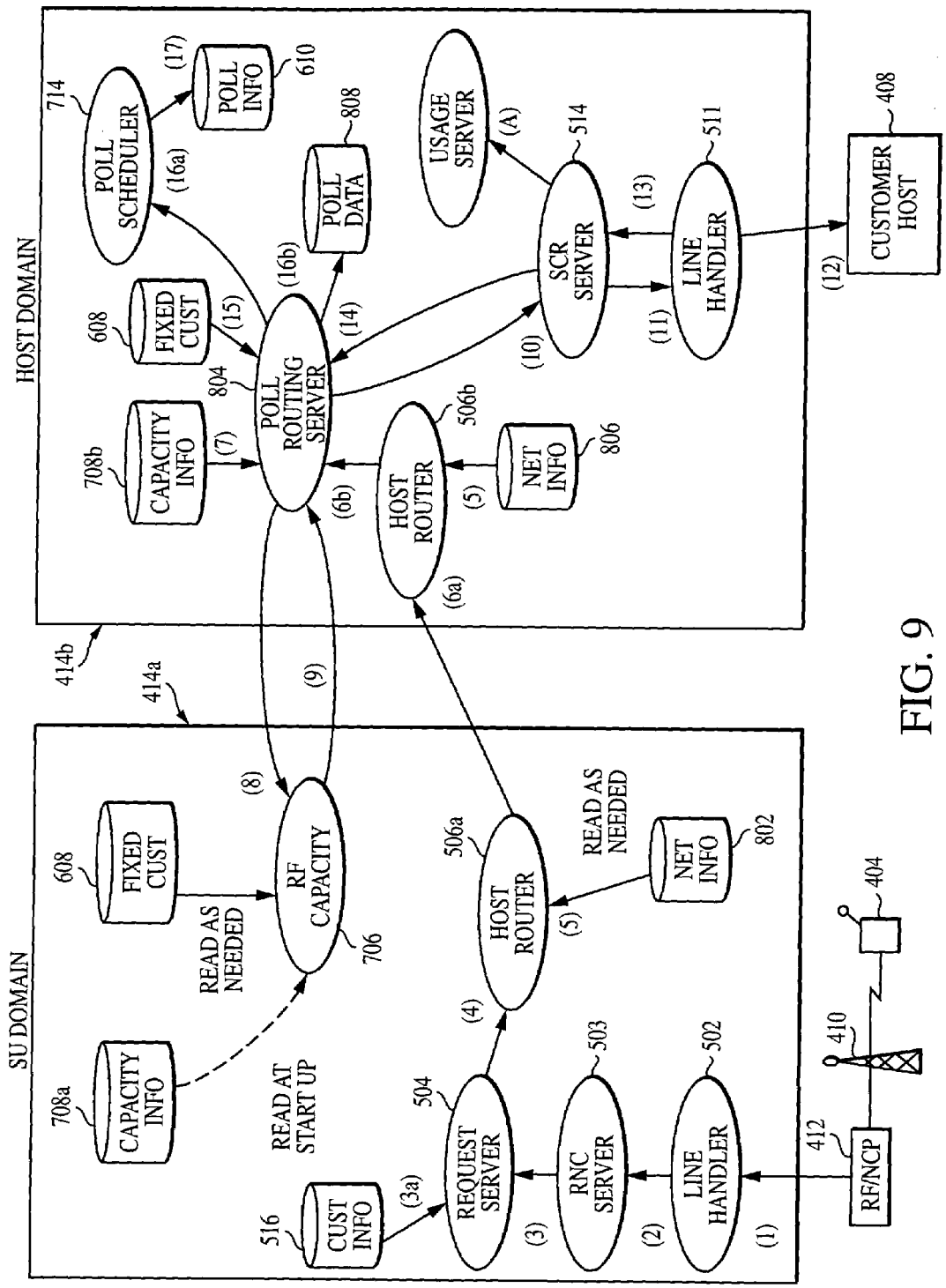
FIG. 9 is an exemplary diagram of a poll response when the subscriber unit and host utilize different routing switches, which also illustrates a method in accordance with the present invention.

FIG. 9 is an exemplary diagram of a SU 404 to host 408 poll response in which the SU 404 and host 408 are associated with ACEs 414a and 414b, respectively. FIG. 9 also illustrates a method in accordance with the present invention. FIG. 9 is applicable when, for example, the SU 404 shown in FIG. 7 transmits (11) an ACK, indicating in response to the poll that the SU 404 has data to transmit.

As shown, a SU 402 via, for example, BTS 410 and RF/NCP 412, transmits (1) a message to ACE 414a. In operation, it is preferred that a message is sent (2) from a SU 404 and (normally) received by host computer 408 via any of the network 400 supported line protocols (e.g., X.25).

The message, via line handler 502, is routed (2) to RNC server 503, which removes the appropriate radio frequency (RF) message header, adds appropriate ACE 414a routing headers, and transmits (3) the message to request server 504. Request server 504 reads (3a) the SU 404 profile from, for example, customer information database 516, which can store all valid SU identification numbers (IDs) and associated host computer(s) 408. The request server 504 then transmits (4) the message to host router 512a, which reads (5) network configuration information from network information database 802. The network information database 802 contains network 400 routing information pertaining to the ACE 414b to which the customer host 408 is connected. Host router 506a then transmits (6a) the message to host router 506b.

The poll routing server 804 then reads (7), as needed, from capacity information database 708b the RF capacity server 706 associated with the SU 404. The RF capacity server 706 checks its internal timer queue and transmits (9) an indication to the poll routing server as to whether a poll request is outstanding. The RF capacity server 706 also maintains lists of outstanding poll requests and timers for RF/NCP 412 and BTSs 410 associated with those lists, and transmits (9) a reply as to whether the message received at host router 506b has a corresponding poll request outstanding. Reply (9) can also be a NAK in the event of, for example, a timeout.

The poll routing server then transmits (10) the data sent in response to the poll to SCR server 514 which, in turn, transmits (11) the message to line handler 511. Line handler 511 then transmits (12) the message to the host 408. Upon receiving the message, the host 408 transmits (13) an ACK via the line handler 511 to SCR server 514 which, in turn, transmits (14) the ACK to the poll routing server 804. The poll routing server 804 then reads (15) the fixed customer database 608 to determine the correct poll scheduler 714 to transmit (16a) the ACK message to. In this case, poll scheduler 714 is associated with ACE 414b (as opposed to ACE 414a). The poll scheduler 714 then updates (17) the poll information database 610 to indicate that the host 408 has received the message and that the poll process is complete.

In the event that the host 408 does not receive the message, NAKs can be sent to SCR server 514 and poll routing server 804. The poll routing server 804 then updates (16b) the polldatq database 808 to indicate that the message should be retransmitted at a subsequent time. Once a poll request has exhausted the maximum number of poll attempts, the poll scheduler 714 can optionally transmit a NAK to the host 408 and mark the poll status as failed.

Figure 10:
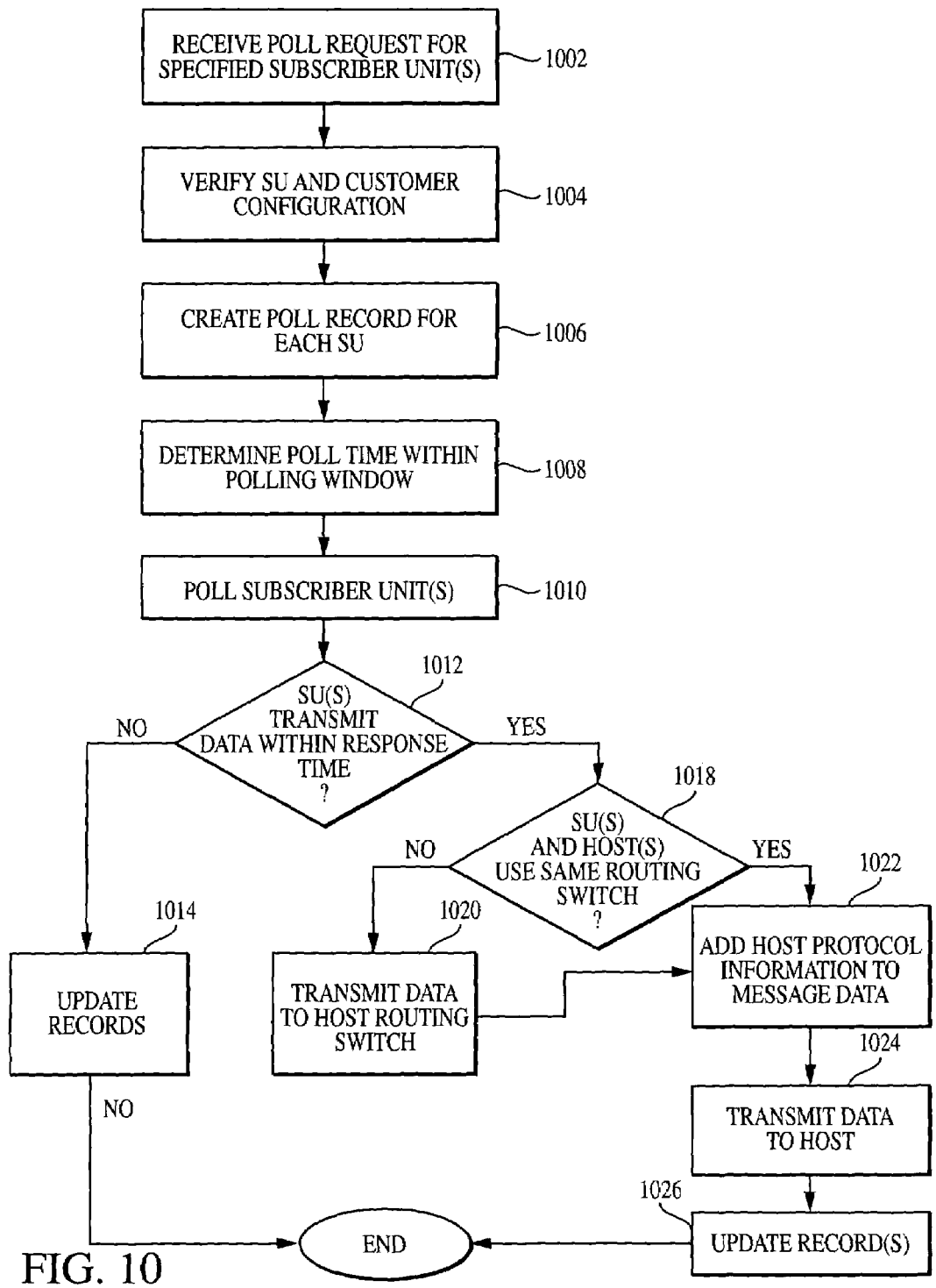
FIG. 10 shows an exemplary method of polling wireless devices having a substantially fixed geographic location.

FIG. 10 shows an exemplary method of polling wireless devices having a substantially fixed geographic location. At step 1002, poll download server 604 receives one or more poll request messages from customer host 408a and/or 408b, and preferably stores them in poll information database 610. At step 1004, the subscriber unit 404 and host 408 configuration (which associates a particular SU 404 with a particular host 408a, 408b) is verified. Poll download server 604 preferably verifies the SU/host configuration from, for example, the SU information database 518, which preferably contains data pertaining to whether the SU 404 that is to be polled is valid and registered to the requesting customer. The poll download server 604 also preferably can also verify from, for example, customer information database 516 that the customer is in good standing, and further verifies from fixed customer database 608 that the customer utilizes the fixed point polling service.

At step 1006, a poll record is created for each SU 404 that is to be polled. For example, poll download server 604, after accepting poll request messages from customer host 408, preferably stores them in the poll information database 610. At step 1008, a polling time within the polling window is determined. For example, poll scheduler 714 can monitor poll start and stop times, poll initiation, poll status and poll retries. To accomplish these tasks, poll scheduler 714 reads from the fixed customer database 608 information such as a host 408 identifier, a poll response window indicating the amount of time (e.g. seconds) after a poll request ACK to consider unsolicited messages from the device as a poll response, and a host failure notification flag that indicates if the host 408 expects a notification after all attempts to poll a SU 404 have failed. The fixed customer database 608 can also store data pertaining to maximum poll responses which if set, for example, to a value of two (or more) indicates that the poll scheduler 714 will wait for the maximum number poll responses to be received, or for the poll response window to expire before considering the RF/NCP 412 available.

At step 1010, designated SUs 402 are polled. To begin polling of SUs 402, poll scheduler 714 reads the poll information database 610 as discussed with regard to FIG. 7. The poll scheduler 714 then preferably updates the poll information database 610 to indicate that the poll request has been queued to the poll queue database 712 which, in at least one embodiment, contains data pertaining to at least the destination RF/NCP 412 for the poll, the time that the record was queued, the host 408 that queued this record, and a destination SU 404 identifier.

The RF capacity server 706 then reads the poll queue database 712 for poll requests, and distributes poll requests to the appropriate RF/NCP(s) 412 and base stations 410 throughout the network 400. When it is time for the RF capacity server 706 to begin distributing poll requests, it reads the poll queue database 712, preferably continually, using, for example, a field pertaining to the RF/NCP 412 and/or BTS 410. If the read completes without error, the RF capacity server 706 transmits the poll request to the appropriate SU manager 702. The RF capacity Server 706 also reads data from the SU information database 518, and deletes poll requests from the pollque database 712 once they have been forwarded to the SU Manager 702. The poll message is subsequently transmitted to the RNC server 503, a line handler designated by the RNC Server 503 (9), to a RF/NCP 412 (10), and to the designated SU 402.

At decision step 1012, a determination is made whether the polled SU 404 responds within a predetermined response time. If the SU 404 responds to the poll within the predetermined time, the SU 402 transmits either an ACK or NAK message, indicating that the SU 404 has information to transmit, or does not have information to transmit, respectively.

At decision step 1018, a determination is made whether the SU 402 and host 408 utilize the same ACE (e.g., ACE 414a and/or 414b). If the SU 404 and host 408 utilize the same ACE 414, the message is transmitted to the host 408 as discussed with regard to FIG. 8. In particular, at step 1022, the SCR server 510 adds, for example, an IB header to the message as discussed with regard to FIG. 5. At step 1024, the message is transmitted to host 408, and the system 400 updates the polling records at step 1026. In particular, and with regard to FIG. 8, when poll routing server 804 receives an ACK, it then reads fixed customer database 608 to determine the correct poll scheduler to transmit (16a) the ACK message to. The poll scheduler 714 then updates (17) the poll information database 610 to indicate that the host 408 has received the message and that the poll process is complete.

If at decision step 1018 it is determined that SU 404 and host 408 do not utilize the same ACE 414, at step 1020 the message is transmitted from the SU's 404 ACE 414a to the ACE 414b associated with the host 408, as discussed with regard to FIG. 9. Steps 1022, 1024 and 1026 are then executed as discussed above.

If at decision step 1012 it is determined that the SU 404 has not responded within a predetermined response time, the poll scheduler 714 can optionally transmit a NAK to the host 408 and mark the poll status as failed in poll information database 610.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. While the foregoing invention has been described in detail by way of illustration and example of preferred embodiments, numerous modifications, substitutions, and alterations are possible without departing from the scope of the invention defined in the following claims.

Having thus described our invention, what we claim as new and desire to secure by Letters Patent is as follows:

1. A wireless communication system for polling wireless devices having a substantially fixed location, said system comprising:
   at least one wireless device capable of receiving a poll request, originating from a host computer, each wireless device communicating with the host computer using a respective predetermined base transceiver station of the system;
   a routing switch communicable with the host computer and the base transceiver station, comprising:
      a poll download server, communicable with the host computer and receiving the poll request from the host computer pertaining to which the at least one wireless device are to be polled, said poll download server communicable with a first data repository for storing the poll request data;
      a poll scheduler server, accessing the first data repository, for queuing the poll request data on a second data repository;
      a radio frequency (RF) capacity server, communicable with said poll scheduler server and the second data repository, for maintaining outstanding poll requests;
      a wireless device management server, communicable with said RF capacity server, for receiving a poll request from said RF capacity server;
      a radio frequency server, communicable with said wireless device management server, for adding radio frequency information to the poll request; and
      a protocol server, communicable with at least said radio frequency server, for adding a protocol header to the poll compatible with the wireless device to which the poll is transmitted.

2. The system according to claim 1, further comprising a fixed customer data repository communicable with said poll download server and said RF capacity server comprising data pertaining to a customer host identifier and the amount of time after a poll acknowledgement is received to consider a message from a wireless device as a poll response.

3. The system according to claim 2, wherein the fixed customer data repository further comprises data pertaining to at least one of the minimum amount of time that must expire before a poll can be retried and the number of polling retries allowed per polling day.

4. The system according to claim 1, wherein said poll download server reads the first data repository to validate at least one of the at least one wireless device and the customer.

5. The system according to claim 1, further comprising a capacity information data repository, communicable with said poll download server and said RF capacity server, comprising data pertaining to the name of the RF capacity server that is controlling the rate at which polls are transmitted to a radio frequency network control processor.

6. The system according to claim 1, wherein the first data repository comprises data pertaining to a host computer identifier, a wireless device identifier, and poll data.

7. The system according to claim 6, wherein the first data repository further comprises data pertaining to at least one of poll data transmitted in the poll message, a status of the poll, and a time at which a last poll was issued.

8. The system according to claim 1, wherein said poll scheduler server reads the poll request data on a substantially real time basis.

9. The system according to claim 1, wherein the poll request data comprises data pertaining to an identifier associated with a wireless device, the predetermined base transceiver station associated with the wireless device, and a customer identifier associated with the wireless device.

10. The system according to claim 1, wherein said poll scheduler server updates the first data repository to indicate that the poll request has been stored in the second data repository.

11. The system according to claim 1, wherein said poll scheduler server receives at least one of an ACK and NAK response message from said RF capacity server respectively indicating that a wireless device has or has not responded to a poll request.

12. The system according to claim 11, wherein said poll scheduler server updates the first data repository with respect to at least one of the ACK and NAK.

13. The system according to claim 1, wherein said RF capacity server deletes poll requests from the second data repository.

14. The system according to claim 1, further comprising a response server, communicable with said radio frequency server, for receiving from said radio frequency server an indication of whether a wireless device is responding to the poll request.

15. The system according to claim 14, wherein the indication is stored in the first data repository.

16. The system according to claim 15, further comprising a poll routing server, communicable with said RF capacity server and said protocol server, for receiving messages from the wireless devices in response to a poll request.

17. The system according to claim 16, wherein said RF capacity server receives a poll inquiry message from said poll routing server and transmits a response to said poll routing server indicating whether the message received from a wireless device has an outstanding poll request.

18. The system according to claim 1, further comprising a request server, communicable with said radio frequency server, receiving data from said wireless device in response to said poll and verifying that said wireless device can transmit the data to said host computer.

19. A wireless communication system for transmitting a data message from a wireless device, comprising:
   a wireless device that receives a poll, originating from a host computer, each wireless device communicating with the host computer using a predetermined base transceiver station of the system;
   a routing switch communicable with the host computer and the base transceiver station, comprising:
      a radio frequency server, communicable with the wireless device, receiving a data message from the wireless device and removing radio frequency information from the data message;
      a host router that reads a profile of the wireless device indicating a host computer to which the wireless device transmits the data message, and adds system routing information to the data message;
      a poll routing server that receives the data message from said host router and determines if an outstanding poll request is associated with the wireless device; and
      a protocol server, communicable with at least said poll routing server, for adding a protocol header to the data message compatible with the host computer to which the data message is transmitted.

20. The system according to claim 19, further comprising a radio frequency (RF) capacity server comprising a timer, said RF capacity server transmitting an indication to said poll routing server as to whether a poll request is outstanding.

21. The system according to claim 20, wherein said RF capacity server further maintains outstanding poll requests and timers for the base transceiver stations.

22. The system according to claim 21, wherein upon receiving the message, the host transmits an acknowledgement to said poll routing server.

23. The system according to claim 22, wherein said poll scheduler updates a poll information database to indicate that the host has received the message.

24. The system according to claim 23, further comprising a poll scheduler that receives the acknowledgement from said poll routing server and updates the poll information database to indicate that the host has received the message.

25. The system according to claim 21, wherein upon the host not receiving the message, the host transmits a negative acknowledgement to said poll routing server.

26. The system according to claim 25, wherein once a poll request has exhausted the maximum number of poll attempts, said poll routing server transmits a message to the host computer indicating that the poll has not been completed.

27. A wireless communication system for transmitting a data message from a wireless device associated with a first routing switch to a host computer associated with a second routing switch, comprising:
   a wireless device that receives a poll, originating from a host computer, each wireless device communicating with the host computer using a predetermined base transceiver station of the system;
   a first routing switch communicable with the wireless device, comprising:
      a radio frequency server, communicable with the wireless device, receiving in response to a poll of the wireless device, a data message from the wireless device and removing radio frequency information from the data message;
      a request server that receives the data message from said radio frequency server and reads a first data repository associating an identifier of the wireless device with a host computer;
      a first host router that reads network configuration information from a second data repository containing system routing information pertaining to a second routing switch; and
      a radio frequency (RF) capacity server that maintains outstanding poll requests;
   a second routing switch communicable with said first routing switch and the host computer, comprising:
      a second host router that receives the message from said first host router;
      a poll routing server that receives the message from said second host router and receives an indication from said RF capacity server whether an outstanding poll request is associated with the wireless device; and
      a protocol server, communicable with at least said poll routing server, for adding a protocol header to the data message compatible with the host computer to which the data message is transmitted.

28. The system according to claim 27, wherein upon receiving the message, the host computer transmits an acknowledgement to said protocol server.

29. The system according to claim 28, wherein said protocol server further transmits the acknowledgement to said poll routing server.

30. The system according to claim 29, wherein said poll routing server reads information from a first data repository to determine a correct poll scheduler to transmit the acknowledgement.

31. The system according to claim 30, wherein said poll scheduler updates a second data repository to indicate that the host has received the message.

* * * * *

UNITED STATES PATENT AND TRADEMARK OFFICE
CERTIFICATE OF CORRECTION

PATENT NO.       : 7,068,992 B1                                                Page 1 of 1
APPLICATION NO.  : 10/606305
DATED            : June 27, 2006
INVENTOR(S)      : Massie et al.

It is certified that error appears in the above-identified patent and that said Letters Patent is hereby corrected as shown below:

Column 14, lines 49-50, "ARDIS Network Connectivity Guide" should read -- *ARDIS Network Connectivity Guide* --

Column 14, line 51, "*Guide*," should read -- *Guide* (Doc. No. 6804111L20-A), --

Column 14, line 53, "1.0," should read -- 1.0 (Doc, No. 68P04025C20-A), --

Column 15, line 10, "second embodimen," should be -- second embodiment --

Signed and Sealed this
Thirteenth Day of November, 2012

David J. Kappos
*Director of the United States Patent and Trademark Office*